US011036355B2

(12) United States Patent
Bae

(10) Patent No.: US 11,036,355 B2
(45) Date of Patent: Jun. 15, 2021

(54) ELECTRONIC DEVICE, SERVER AND METHOD FOR FILTERING, BLOCKING AND REPLACING WEB OBJECTS

(71) Applicant: Samsung Electronics Co., Ltd., Suwon-si (KR)

(72) Inventor: Ki-Bum Bae, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 185 days.

(21) Appl. No.: 15/424,160

(22) Filed: Feb. 3, 2017

(65) Prior Publication Data

US 2017/0220209 A1    Aug. 3, 2017

(30) Foreign Application Priority Data

Feb. 3, 2016    (KR) .................. 10-2016-0013510

(51) Int. Cl.
*G06F 3/0482*    (2013.01)
*H04L 29/08*    (2006.01)
(Continued)

(52) U.S. Cl.
CPC ......... *G06F 3/0482* (2013.01); *G06K 9/6262* (2013.01); *G06K 9/6267* (2013.01);
(Continued)

(58) Field of Classification Search
CPC .............. G06Q 30/02; G06Q 30/0277; G06Q 30/0241; G06F 17/30699; G06F 17/30867;
(Continued)

(56) References Cited

U.S. PATENT DOCUMENTS 6,356,924 B2 * 3/2002 Mullen-Schultz ..........................
G06F 16/9577
715/236
6,701,350 B1    3/2004 Mitchell
(Continued)

FOREIGN PATENT DOCUMENTS

EP    2 178 009 A1    4/2010
JP    2014-056612 A    3/2014
(Continued)

OTHER PUBLICATIONS

Guang Xiang et al: "Cantina+: A Feature-Rich Machine Learning Framework for Detecting Phishing Web Sites", ACM Transactions on Information and System Security, ACM, New York, NY, US, vol. 14, No. 2, Sep. 1, 2011 (Sep. 1, 2011), pp. 21:1-21:28, XP001574920, ISSN: 1094-9224, DOI:10.1145/2019599.2019606.
(Continued)

*Primary Examiner* — Andrew L Tank
(74) *Attorney, Agent, or Firm* — Jefferson IP Law, LLP

(57) ABSTRACT

A method for controlling displaying, an electronic device therefor, and a server and method therefor are provided. The method includes transmitting information including at least one input keyword to a server, receiving, from the server, a recognition model for filtering out an object included in a received webpage, installing the recognition model, determining whether a first object corresponding to the at least one input keyword exists in the webpage, when the first object corresponding to the input keyword exists in the webpage, processing the first object to become a second object, and displaying the webpage including the processed object.

15 Claims, 12 Drawing Sheets

(51) Int. Cl.
*G06K 9/62* (2006.01)
*G06Q 30/02* (2012.01)
*H04N 21/431* (2011.01)
*H04L 29/06* (2006.01)

(52) U.S. Cl.
CPC ............. *G06Q 30/02* (2013.01); *H04L 67/02* (2013.01); *H04N 21/4318* (2013.01); *H04L 67/42* (2013.01)

(58) Field of Classification Search
CPC .. H04N 21/4318; H04N 21/452; H04L 67/02; H04L 67/42; H04L 636/0227
See application file for complete search history.

(56) References Cited

U.S. PATENT DOCUMENTS

| | | | |
|---|---|---|---|
| 8,224,950 B2* | 7/2012 | Humes | H04L 29/06 709/224 |
| 9,331,970 B2* | 5/2016 | Yuen | H04L 51/32 |
| 2002/0010757 A1* | 1/2002 | Granik | G06F 16/955 709/218 |
| 2003/0208472 A1* | 11/2003 | Pham | H04L 29/06 |
| 2005/0131868 A1 | 6/2005 | Lin et al. | |
| 2007/0136136 A1* | 6/2007 | Nossik | G06Q 30/02 705/14.66 |
| 2007/0208751 A1* | 9/2007 | Cowan | G06Q 10/10 |
| 2007/0260520 A1* | 11/2007 | Jha | G06Q 30/02 705/14.44 |
| 2008/0306816 A1 | 12/2008 | Matthys et al. | |
| 2008/0320577 A1* | 12/2008 | Larduinat | G06F 21/34 726/9 |
| 2009/0158133 A1* | 6/2009 | Serena | G06Q 30/02 715/208 |
| 2009/0187483 A1* | 7/2009 | You | G06Q 30/02 705/14.52 |
| 2009/0187486 A1* | 7/2009 | Lefenfeld | G06Q 30/02 705/14.73 |
| 2010/0011261 A1* | 1/2010 | Cagno | G06F 11/1064 714/719 |
| 2011/0283309 A1* | 11/2011 | Bliss | H04N 21/4532 725/25 |
| 2012/0023593 A1 | 1/2012 | Puder et al. | |
| 2012/0042289 A1* | 2/2012 | Cragun | G06F 16/9577 715/865 |
| 2012/0072535 A1* | 3/2012 | Veiseh | G06F 21/6245 709/217 |
| 2012/0151329 A1* | 6/2012 | Cordasco | G06F 11/3006 715/234 |
| 2013/0185802 A1 | 7/2013 | Tibeica et al. | |
| 2013/0212465 A1* | 8/2013 | Kovatch | G06F 17/227 715/234 |
| 2013/0227394 A1* | 8/2013 | Sazhin | G06Q 30/02 715/234 |
| 2013/0238638 A1* | 9/2013 | Doron | G06F 17/30994 707/754 |
| 2014/0380144 A1 | 12/2014 | Liang | |
| 2017/0147156 A1* | 5/2017 | Compain | G06F 17/2247 |

FOREIGN PATENT DOCUMENTS

| | | |
|---|---|---|
| KR | 10-0658799 B1 | 12/2006 |
| KR | 10-1138578 B1 | 5/2012 |
| KR | 10-2013-0105026 A | 9/2013 |

OTHER PUBLICATIONS

European Search Report dated Oct. 22, 2018, issued in European Application No. 17747802.1.

* cited by examiner

ELECTRONIC DEVICE, SERVER AND METHOD FOR FILTERING, BLOCKING AND REPLACING WEB OBJECTS

CROSS-REFERENCE TO RELATED APPLICATION(S)

This application claims the benefit under 35 U.S.C. § 119(a) of a Korean patent application filed on Feb. 3, 2016 in the Korean Intellectual Property Office and assigned Serial number 10-2016-0013510, the entire disclosure of which is hereby incorporated by reference.

TECHNICAL FIELD

The present disclosure relates to control displaying. More particularly, the present disclosure relates to an electronic device and a server for controlling the displaying of an object on a display of the electronic device, and methods therefor.

BACKGROUND

Recently, various services and additional functions provided by electronic devices have been gradually expanded. To raise the effective value of an electronic device and to satisfy various desires of users, communication service providers or electronic device manufacturers have competitively developed electronic devices that provide more various functions in order to be distinguished from electronic devices of other manufacturers. As one example of satisfying the desires of users, an electronic device is capable of providing various web browsers for accessing the internet.

When a user inputs a word or sentence for searching through a web browser, an electronic device performs a search on the internet, receives a webpage, and outputs the received webpage through a display unit of the electronic device.

The above information is presented as background information only to assist with an understanding of the present disclosure. No determination has been made, and no assertion is made, as to whether any of the above might be applicable as prior art with regard to the present disclosure.

SUMMARY

When a webpage is received through searching on the internet according to the related art, an electronic device provides a user with the received webpage including an object that the user does not desire (e.g., a banner advertisement, a gaudy scene, or the like). Accordingly, the user has no choice but to view the undesired object or scene, and minors may view an object that is not allowed to be viewed without filtering, which is a drawback.

Aspects of the present disclosure are to address at least the above-mentioned problems and/or disadvantages and to provide at least the advantages described below. Accordingly, an aspect of the present disclosure is to provide a service that recognizes a webpage including an undesired object or scene based on a keyword associated with an undesired object or scene input by a user in advance through an electronic device, and provides a warning or blocks the webpage including the undesired object or scene.

In accordance with an aspect of the present disclosure, a method of controlling displaying in an electronic device is provided. The method includes transmitting information including at least one input keyword to a server, receiving, from the server, a recognition model for filtering out an object included in a received webpage, installing the recognition model, determining whether a first object corresponding to the at least one input keyword exists in the webpage, and when the first object exists in the webpage, processing the first object to be a second object, and displaying the webpage including the second object.

In accordance with another aspect of the present disclosure, an electronic device for controlling displaying is provided. The electronic device includes a display configured to display at least one input keyword, a transceiver configured to transmit information including the at least one input keyword to a server, at least one processor configured to receive, from the server, install a recognition model for filtering out an object included in a received webpage, determine whether a first object corresponding to the at least one input keyword exists in the webpage, when the first object exists in the webpage, process the object to be a second object, and control the display to display the webpage including the second object (processed object).

In accordance with another aspect of the present disclosure, a method of transmitting a recognition model for filtering out at least one object, by a server, to an electronic device that controls displaying is provided. The method includes receiving at least one keyword from the electronic device, establishing a database by collecting the at least one object related to the received keyword, generating a recognition model using the collected at least one object, and transmitting the generated recognition model to the electronic device.

In accordance with another aspect of the present disclosure, a server configured to transmit a recognition model for filtering out an object included in a webpage to an electronic device that controls displaying is provided. The server includes a transceiver configured to receive at least one keyword from the electronic device, and at least one processor configured to establish a database by collecting at least one object related to the at least one received keyword, generate a recognition model using the collected at least one object, wherein the transceiver is further configured to transmit the generated recognition model to the electronic device.

According to various embodiments of the present disclosure, an object that a user does not desire to view and exists on a page displayed in a display unit may be filtered out.

According to various embodiments of the present disclosure, at least one keyword associated with an object or a scene that a user does not desire to view is transmitted to a server, and a recognition model that is capable of filtering out the object or the scene is received from the server and is installed, and thus, the user may view only a webpage excluding the object or the scene from the webpage received through searching on the internet.

According to various embodiments of the present disclosure, an object corresponding to an advertisement included in a page displayed in a display unit may be replaced with another object or may be removed.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
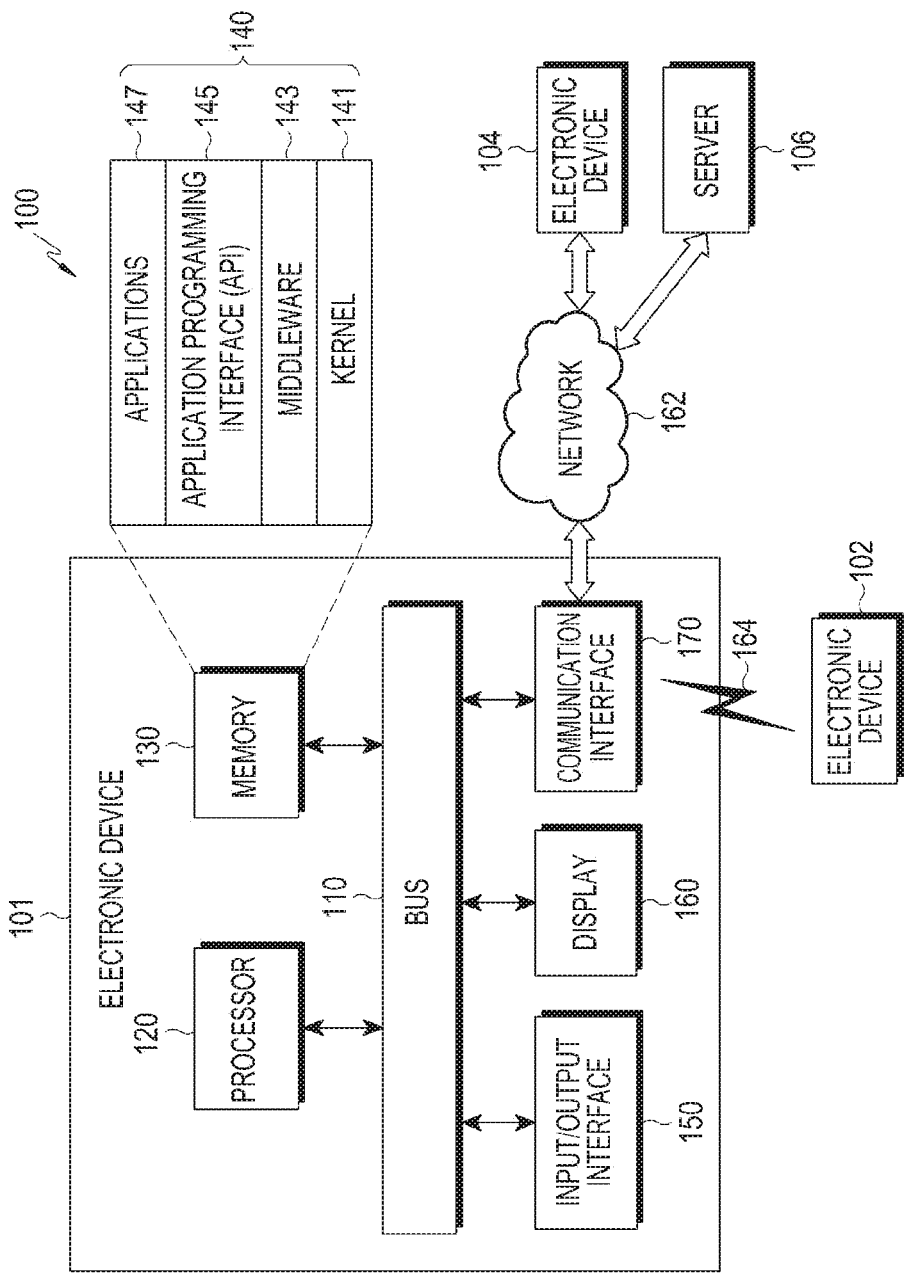
FIG. 1 is a diagram illustrating an electronic device 101 in a network environment 100 according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude various embodiments of the present disclosure.

An electronic device according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a Moving Picture Experts Group (MPEG-1 or MPEG-2) audio layer-3 (MP3) player, a mobile medical device, a camera, and a wearable device. According to various embodiments, the wearable device may include at least one of an accessory type (e.g., a watch, a ring, a bracelet, an anklet, a necklace, glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The smart home appliance may include at least one of, for example, a television, a digital versatile disc (DVD) player, an audio, a refrigerator, an air conditioner, a vacuum cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ and PlayStation™), an electronic dictionary, an electronic key, a camcorder, a charging device and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices (VID), an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments of the present disclosure, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, an electronic device according to various embodiments of the present disclosure will be described with reference to the accompanying drawings. In the present disclosure, the term "user" may indicate a person using an electronic device or a device (e.g., an artificial intelligence electronic device) using an electronic device.

FIG. 1 is a diagram illustrating an electronic device 101 in a network environment 100 according to various embodiments of the present disclosure.

Referring to FIG. 1, the electronic device 101 may include a bus 110, a processor 120 (e.g., at least one processor), a memory 130, an input/output interface 150, a display 160, and a communication interface 170. In some embodiments, the electronic device 101 may omit at least one of the elements, or may further include other elements.

The bus 110 may include, for example, a circuit that interconnects the elements 110 to 170 and delivers communication (e.g., a control message and/or data) between the elements 110 to 170.

The processor 120 may include one or more of a central processing unit (CPU), an application processor (AP), and a communication processor (CP). The processor 120, for example, may carry out operations or data processing relating to the control and/or communication of at least one other element of the electronic device 101.

The memory 130 may include a volatile and/or non-volatile memory. The memory 130 may store, for example, instructions or data relevant to at least one other element of the electronic device 101.

The kernel 141 may control or manage system resources (e.g., the bus 110, the processor 120, or the memory 130) used for executing an operation or function implemented in other programs (e.g., the middleware 143, the application programming interface (API) 145, or the application or applications 147 (e.g., application programs)).

The middleware 143 may function as, for example, an intermediary for allowing the API 145 or the applications 147 to communicate with the kernel 141 to exchange data.

The API 145 may be, for example, an interface through which at least one the applications 147 controls a function provided by the kernel 141 or the middleware 143.

The input/output interface 150 may function as, for example, an interface that can forward instructions or data, which are input from a user or an external device, to the other element(s) of the electronic device 101.

Examples of the display 160 may include a liquid crystal display (LCD), a light-emitting diode (LED) display, an organic LED (OLED) display, a micro-electro-mechanical systems (MEMS) display, or an electronic paper display.

The communication interface 170 may configure communication, for example, between the electronic device 101 and an external device (e.g., a first external electronic device 102, a second external electronic device 104, or a server 106) via a network 162.

The wireless communication may use, for example, at least one of long term evolution (LTE), LTE-advance (LTE- A), code division multiple access (CDMA), wideband CDMA (WCDMA), universal mobile telecommunications system (UMTS), wireless broadband (WiBro), global system for mobile communications (GSM), and the like, as a cellular communication protocol. In addition, the wireless communication may include, for example, short range communication 164.

Each of the first and second external electronic devices 102 and 104 may be of a type that is the same as, or different from, the electronic device 101. According to an embodiment, the server 106 may include a group of one or more servers.

Figure 2:
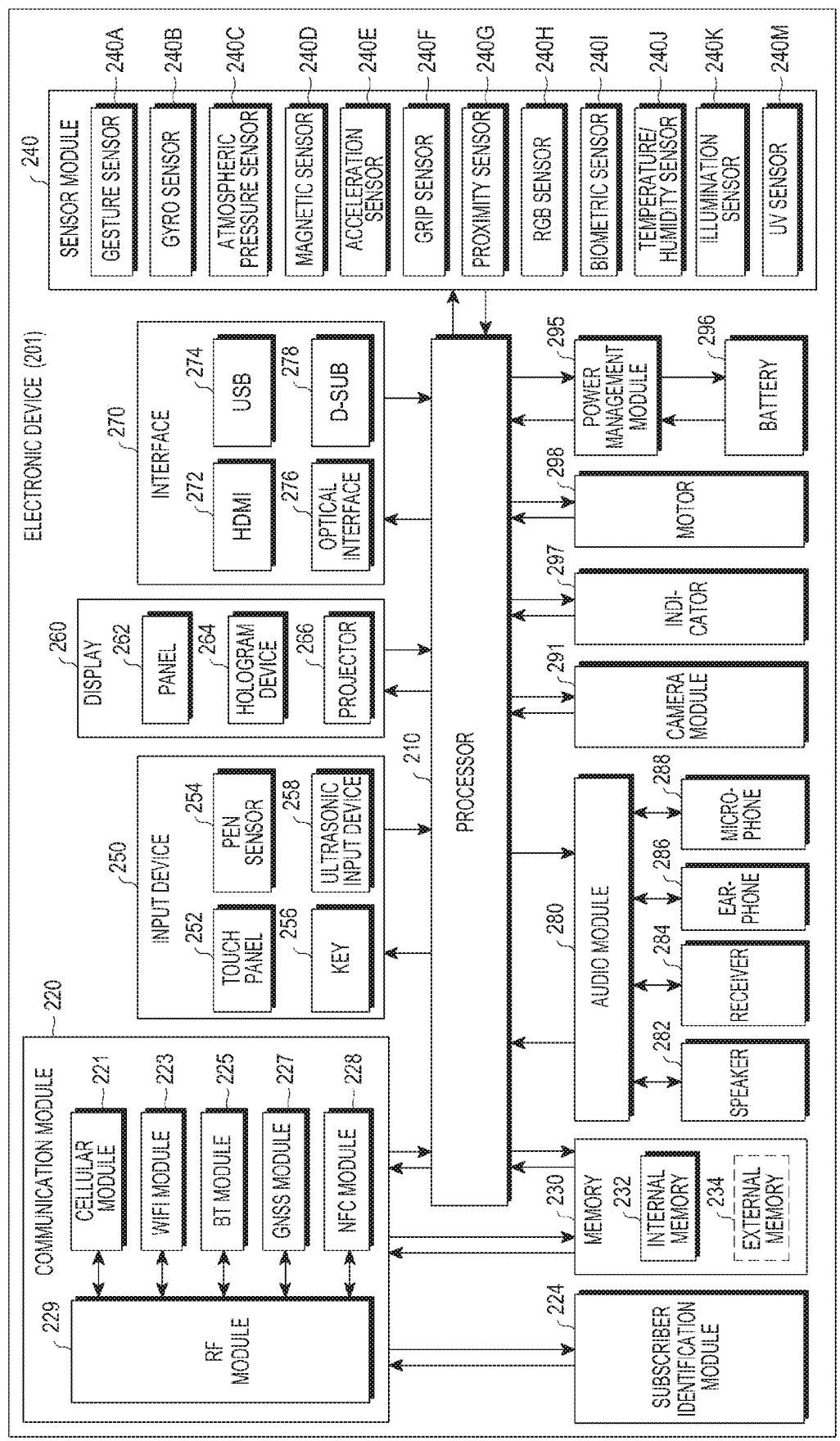
FIG. 2 is a block diagram of an electronic device 201 according to various embodiments of the present disclosure.

FIG. 2 is a block diagram of an electronic device 201 according to various embodiments of the present disclosure.

Referring to FIG. 2, the electronic device 201 may include, for example, the entirety or a part of the electronic device 101 illustrated in FIG. 1. The electronic device 201 may include at least one application processor (AP) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may drive, for example, an operating system (OS) or application programs to control a plurality of hardware or software elements connected thereto and may perform various types of data processing and operations. The processor 210 may be embodied, for example, as a system on chip (SoC).

The communication module 220 may have a configuration equal or similar to that of the communication interface 170 of FIG. 1. The communication module 220 may include, for example, a cellular module 221, a Wi-Fi module 223, a Bluetooth (BT) module 225, a global navigation satellite system (GNSS) module 227 (e.g., a global positioning system (GPS) module, a global navigation satellite system (Glonass) module, a Beidou module, or a Galileo module), a near field communication (NFC) module 228, and a radio frequency (RF) module 229.

The cellular module 221 may provide, for example, a voice call, a video call, a text message service, an internet service, or the like through a communication network. According to an embodiment, the cellular module 221 may identify and authenticate the electronic device 201 within a communication network using the subscriber identification module (SIM) 224 (e.g., a SIM card).

The Wi-Fi module 223, the Bluetooth (BT) module 225, the GNSS module 227, or the NFC module 228 may include, for example, a processor for processing data that is transmitted and received through a corresponding module.

The RF module 229 may transmit/receive, for example, a communication signal (e.g., an RF signal). The RF module 229 may include, for example, a transceiver, a power amplifier module (PAM), a frequency filter, a low noise amplifier (LNA), an antenna, or the like.

The SIM 224 may include, for example, a card including a subscriber identity module and/or an embedded SIM, and may contain unique identification information (e.g., an integrated circuit card identifier (ICCID)) or subscriber information (e.g., an international mobile subscriber identity (IMSI)).

The memory 230 (e.g., the memory 130) may include, for example, an embedded or internal memory 232 or an external memory 234.

The sensor module 240 may, for example, measure a physical quantity or detect the operating state of the electronic device 201 and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor or RGB sensor 240H (e.g., a red, green, and blue (RGB) sensor), a biometric sensor 240I, a temperature/humidity sensor 240J, an illumination sensor 240K, and an ultra-violet (UV) sensor 240M.

The input device 250 may include, for example, a touch panel 252, a (digital) pen sensor 254, a key 256, or an ultrasonic input unit 258. The touch panel 252 may use, for example, at least one of a capacitive type, a resistive type, an infrared type, and an ultrasonic type.

The (digital) pen sensor 254 (e.g., digital stylus) may include, for example, a recognition sheet that is a part of the touch panel or a separate recognition sheet. The key 256 may include, for example, a physical button, an optical key, or a keypad. The ultrasonic input device 258 may detect ultrasonic waves, which are generated by an input tool, through a microphone (e.g., a microphone 288) and may identify data corresponding to the detected ultrasonic waves.

The display 260 (e.g., the display 160 shown in FIG. 1) may include a panel 262, a hologram device 264 or a projector 266. The panel 262 may include a configuration that is the same as, or similar to, that of the display 160 illustrated in FIG. 1. The panel 262 may be implemented to be, for example, flexible, transparent, or wearable. The panel 262, together with the touch panel 252, may be implemented as one module.

The interface 270 may include, for example, a high-definition multimedia interface (HDMI) 272, a universal serial bus (USB) 274, an optical interface 276, and a D-subminiature (D-sub) 278. The interface 270 may be included, for example, in the communication interface 170 illustrated in FIG. 1.

The audio module 280 may convert, for example, a sound into an electrical signal, and vice versa. At least some elements of the audio module 280 may be included, for example, in the input/output interface 150 illustrated in FIG. 1. The audio module 280 may process sound information input or output through, for example, a speaker 282, a receiver 284, and earphone 286, or a microphone 288.

The camera module 291 is a device that can photograph a still image and a dynamic image. According to an embodiment, the camera module 291 may include one or more image sensors (e.g., a front sensor or a rear sensor), a lens, an image signal processor (ISP), or a flash (e.g., an LED, a xenon lamp, or the like).

The power management module 295 may manage, for example, the power of the electronic device 201. The electronic device 201 may be an electronic device that is provided with power through a battery, but the electronic device 201 may not be limited thereto.

The indicator 297 may display a particular state, for example, a booting state, a message state, a charging state, or the like of the electronic device 201 or a part (e.g., the processor 210) of the electronic device 201. The motor 298 may convert an electrical signal into a mechanical vibration and may generate a vibration, a haptic effect, or the like.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments of the present disclosure may be combined into one entity, which may perform functions identical to those of the relevant components before the combination.

Figure 3:
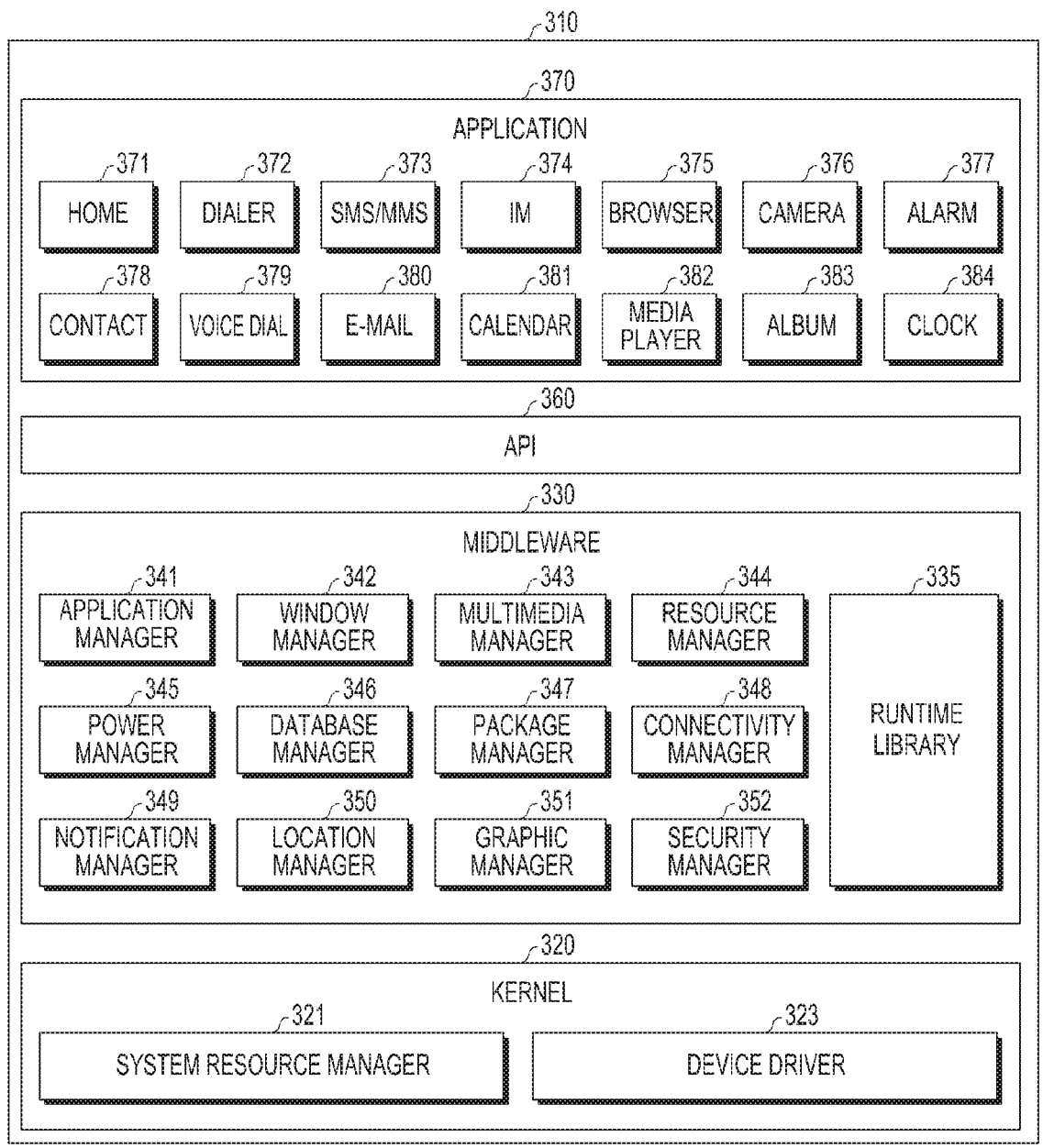
FIG. 3 is a block diagram of a program module according to various embodiments of the present disclosure.

FIG. 3 is a block diagram of a program module according to various embodiments of the present disclosure.

Referring to FIG. 3, according to an embodiment, the program module 310 (e.g., the program 140) may include an operating system (OS) that controls resources relating to an electronic device (e.g., the electronic device 101) and/or various applications (e.g., the application programs or applications 147) that are executed in the OS.

The program module 310 may include a kernel 320, middleware 330, an application programming interface (API) 360, and/or one or more applications 370.

The kernel 320 (e.g., the kernel 141) may include, for example, a system resource manager 321 and/or a device driver 323. The system resource manager 321 may control, allocate, or retrieve system resources.

The middleware 330 may provide, for example, a function required by the applications 370 in common, or may provide various functions to the applications 370 through the API 360 such that the applications 370 can efficiently use limited system resources within the electronic device. According to an embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function through a programming language while the applications 370 are executed.

The application manager 341 may manage, for example, the life cycle of at least one of the applications 370.

The power manager 345 may operate together with, for example, a basic input/output system (BIOS) to manage a battery or power, and may provide power information required for the operation of the electronic device.

The connectivity manager 348 may manage a wireless connection, such as Wi-Fi, BT, and the like. The notification manager 349 may display or notify of an event, such as an arrival message, an appointment, a proximity notification, or the like, in such a manner as not to disturb a user.

The middleware 330 may include a middleware module that forms a combination of various functions of the above-described elements.

The API 360 (e.g., the API 145) is, for example, a set of API programming functions, and may be provided in different configurations according to operating systems.

The applications 370 (e.g., the applications 147 shown in FIG. 1) may include one or more applications that can perform functions, for example, home 371, dialer 372, short message service (SMS)/multi-media messaging service (MMS) 373, instant message (IM) 374, browser 375, camera 376, alarm 377, contacts 378, voice dial 379, e-mail 380, calendar 381, media player 382, album 383, clock 384, health care (e.g., measuring exercise quantity or blood sugar) (not shown), and environment information (e.g., atmospheric pressure, humidity, temperature information, and the like) (not shown).

According to an embodiment, the applications 370 may include an application (hereinafter, referred to as an "information exchange application" for convenience of description) that supports information exchange between the electronic device (e.g., the electronic device 101) and an external electronic device (e.g., the electronic device 102 or 104).

The device management application may manage (e.g., install, delete, or update), for example, at least one function of an external electronic device (e.g., the electronic device 102 or 104) that communicates with the electronic device (e.g., a function of turning on/off the external electronic device itself (or some components thereof) or a function of adjusting the brightness (or resolution) of a display), applications that operate in the external electronic device, or services (e.g., a call service, a message service, and the like) that are provided by the external electronic device.

According to an embodiment, the applications 370 may include applications (e.g., a health care application of a mobile medical appliance, and the like) designated according to the attributes of an external electronic device (e.g., the electronic device 102 or 104).

According to various embodiments of the present disclosure, at least a part of the programming module 310 may be embodied as software, firmware, hardware, or a combination of two or more thereof. At least some of the program module 310 may be implemented (e.g., executed) by, for example, the processor (e.g., the processor 210).

Figure 4:
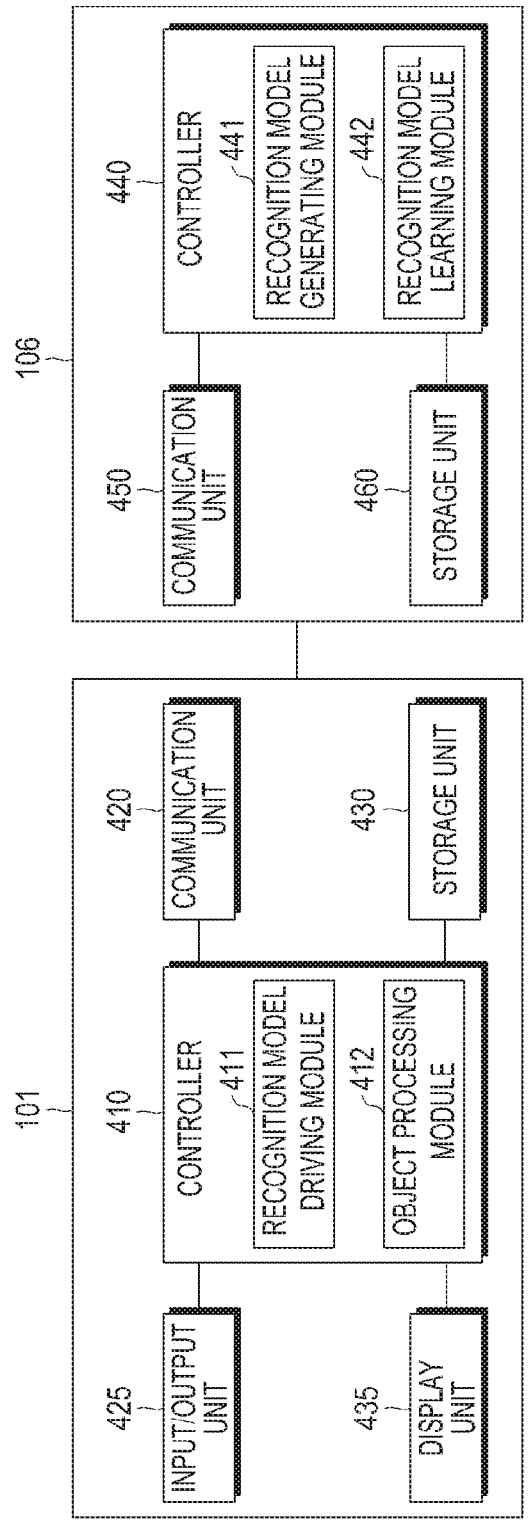
FIG. 4 is a block diagram of an electronic device and a server according to various embodiments of the present disclosure.

FIG. 4 is a block diagram of an electronic device and a server according to various embodiments of the present disclosure.

Referring to FIG. 4, the electronic device 101 according to various embodiments of the present disclosure may include a communication unit 420 (e.g., a transceiver), an input/output unit 425, a storage unit 430, a display unit 435, and a controller 410 (e.g., at least one processor).

According to various embodiments of the present disclosure, the communication unit 420 may perform at least one function or at least one operation performed in the communication interface 170 of FIG. 1. The communication unit 420 may perform data communication with the server 106. The communication unit 420 may transmit information including a keyword input through the display unit 435 to the server 106, and may receive a recognition model corresponding to the keyword transmitted from the server 106. Alternatively, the communication unit 420 may be capable of performing communication with an external electronic device 102 or 104, in addition to the server 106, and may receive an object (e.g., text, images, videos, or the like) using a web browser.

According to various embodiments of the present disclosure, the input/output unit 425 may perform at least one function or at least one operation performed in the input/output interface 150 of FIG. 1. The input/output unit 425 may provide voice or vibration to a user. The input/output unit 425 may output a warning message before displaying an object included in a webpage. The warning may include a voice message or vibration in order to enable a user to be aware of an object included in the webpage. The user may recognize the warning message, and may recognize that an undesired object is included in the webpage. The input/output unit 425 may output a warning message to enable the user to recognize the warning message at the same time as or before/after the input/output unit 425 displays, in the display unit 435, a pop-up window that asks whether to block the object included in the webpage.

According to various embodiments of the present disclosure, the storage unit 430 may perform at least one function or at least one operation performed in the memory 130 of FIG. 1. Alternatively, the storage unit 430 may store information or data stored in the memory 130. The storage unit 430 may store at least one keyword input in the display unit 435, and may map at least one object and/or scene corresponding to each keyword and store the same. The storage unit 430 may store at least one recognition model received from the server 106. The recognition model may be stored separately for each keyword, may be activated automatically in response to the input of a keyword or under the control of the controller 410, and may be operated when a webpage is received through a web browser. The recognition model may be activated in response to the execution of a web browser.

According to various embodiments of the present disclosure, the display unit 435 may perform at least one function or at least one operation performed in the display 160 of FIG. 1. The display unit 435 may include a touch screen that is capable of sensing a touch or a hovering, and may display a webpage (or an internet page) received through the communication unit 420. The display unit 435 may display a webpage according to a scheme determined by the controller 410. The display unit 435 may display a warning message before displaying an object included in a webpage. The display unit 435 may display a pop-up window that asks whether to block an object included in the webpage. When an object (e.g., an image, a video, an advertisement, or the like) that a user does not request is included in a webpage, the display unit 435 may display a webpage including another object that replaces the object under the control of the controller 410. The display unit 435 may display a process of installing a recognition model received from the server 106.

According to various embodiments of the present disclosure, the controller 410 may perform at least one function or at least one operation performed by the processor 120 of FIG. 1. The controller 410 may store or install a recognition model received from the server 106 in the storage unit 430. The controller 410 may include a recognition model driving module 411 for driving a recognition model corresponding to an input keyword and an object processing module 412 for processing an object included in a webpage in the state in which the recognition model drives. The recognition model driving module 411 may automatically drive in response to an input keyword. For example, the recognition model driving module 411 may drive a single recognition model corresponding to an input keyword when a single keyword is input, and the recognition model driving module 411 may drive a plurality of recognition models corresponding to keywords, respectively, when a plurality of keywords is input. The controller 410 may update a recognition module subsequently installed in response to an input keyword by receiving data for updating from the server 106.

According to various embodiments of the present disclosure, the controller 410 may transmit information including at least one input keyword to a server, may receive, from the server, a recognition model for filtering out an object included in a received webpage based on the keyword and install the recognition model, may determine whether an object corresponding to the keyword exists in the webpage, and may display a webpage obtained by processing the object to be another object. To this end, the controller 410 may control at least one of the communication unit 420, the input/output unit 425, the storage unit 430, and the display unit 435 included in the electronic device 101.

According to various embodiments of the present disclosure, the controller 410 may perform a control to transmit information including at least one input keyword and the identification number of the electronic device 101 to the server 106. When a keyword corresponding to at least one of an object and a scene that a user does not desire to view is input, the controller 410 may transmit information including at least one input keyword and the identification number of the electronic device 101 to the server 106. When an object corresponding to a keyword input in advance exists in a webpage received through searching on the internet, the controller 410 may perform displaying by processing the object. When an object that a user no longer desires to view exists in the received webpage, the user inputs a keyword corresponding to the object, and the controller 410 may transmit the input keyword to the server 106. When an object corresponding to the input keyword is included in the webpage, the controller 410 may output, to the display unit 435, a menu for selecting another object that replaces the object. The user may select an object that the user desires to use through the displayed menu. When the object to be used is selected, the controller 410 may replace the object corresponding to the input keyword in the received webpage with the selected object, and output the same in the display unit 435. Alternatively, the controller 410 may replace the object corresponding to the input keyword in the received webpage with another object designated in advance, and may output the same to the display unit 435.

According to various embodiments of the present disclosure, the controller 410 may determine whether an object is included in a webpage received through searching on the internet. For the determination, a user may input a keyword associated with at least one of an object and a scene that the user does not desire to view, and the controller 410 may transmit the input keyword to the server 106, and may receive, from the server 106, a recognition model for filtering out an object included in the webpage and install the recognition model. The controller 410 may install the received recognition model in the web browser in a plug-in manner.

According to various embodiments of the present disclosure, when an object to be filtered out exists, the controller 410 may determine a scheme of outputting a webpage. The outputting scheme may include a scheme of outputting a warning message before displaying the object, and a scheme of replacing the object with another object and displaying the same. The scheme may be set in advance. Alternatively, when it is determined that an object corresponding to a keyword exists in a webpage, the controller 410 may generate a pop-up window that asks whether to block the object, and may output the generated pop-up window in the display unit 435. The pop-up window may include information for asking a user whether to display the webpage including the object corresponding to the keyword as it is, whether to replace the object corresponding to the keyword with another object for displaying a webpage, or whether to replace the object corresponding to the keyword with another object designated in advance for displaying a webpage. As described above, the keyword may include a word (e.g., a term input when a user desires to search for or obtain related information) that is input for viewing a webpage obtained by replacing at least one of an object and a scene that the user does not desire to view in the webpage with another object or another scene. When the input for viewing, the object is received through the pop-up window, the controller 410 may replace the other object with the object. In the state in which a recognition model corresponding to a keyword input in advance drives, when it is detected that a new keyword is input, the controller 410 may transmit the input new keyword to the server. Also, when a request for deleting (or updating) a predetermined keyword is input by a user, the controller 410 may transmit the corresponding keyword to the server.

The server 106 according to various embodiments of the present disclosure may include a communication unit 450 (e.g., a transceiver), a storage unit 460, and a controller 440 (e.g., at least one processor).

According to various embodiments of the present disclosure, the communication unit 450 may perform at least one function or at least one operation by interoperating with the communication unit 420 of the electronic device 101. The communication unit 450 may perform data communication with the electronic device 101. The communication unit 450 may receive information including a keyword received from the electronic device 101. The communication unit 450 may transmit a webpage including at least one object to the electronic device 101 based on a received keyword, and may transmit a recognition model generated based on the keyword to the corresponding electronic device.

According to various embodiments of the present disclosure, the storage unit 460 may perform at least one function or at least one operation by interoperating with the storage unit 430 of the electronic device 101. The storage unit 460 may store at least one keyword received through the communication unit 450, and may map at least one object and/or scene corresponding to each keyword to store the same or to establish a database. The storage unit 460 may map at least one object and/or scene corresponding to each keyword received for each electronic device to store the same or to establish a database. The storage unit 460 may store at least one recognition model to be transmitted to the electronic device 101. The recognition model may be stored for each keyword, may be activated automatically in response to the input of a keyword or under the control of the controller 410, and may be operated when a webpage is received through a web browser. The recognition model may be activated in response to the execution of a web browser.

According to various embodiments of the present disclosure, the controller 440 may perform at least one function or at least one operation by interoperating with the controller 410 of the electronic device 101. When information including at least one keyword and an identification number is received from the electronic device 101, the controller 440 may collect an object associated with the at least one received keyword and establish a database, and may generate a recognition model using the object collected according to the received keyword. The controller 440 may generate a recognition model based on at least one keyword received from at least one electronic device. The controller 440 may store, in the storage unit 460, at least one keyword and an identification number received from the electronic device 101. The controller 440 may include a recognition model generating module 441 for generating a recognition model based on a received keyword, and a recognition model learning module 442 that learns the recognition model. The controller 440 may generate a recognition model based on a received keyword through the recognition model generating module 441. For example, when a single keyword is received for each electronic device, the recognition model generating module 441 may generate a single recognition model corresponding to the received keyword. When a plurality of keywords is received, the recognition model generating module 441 may generate a recognition model that filters out an object that corresponds to each keyword. The controller 440 may collect an object related to a received keyword, and may establish a database. The controller 440 may generate a recognition model using at least one of a pattern recognition, a neural network, a deep leaning, based on the collected object. The deep learning may be defined as a set of learning algorithms that attempt a high-level abstraction through the combination of various non-linear transform schemes, and may be a branch of machine learning that teaches a user's way of thinking to a computer. The controller 440 may periodically or repeatedly learn a generated recognition model through the recognition model learning module 442, and may complete an optimal recognition model. When a new keyword is received from the electronic device 101 in the state in which the recognition model is transmitted to the electronic device 101, the controller 440 collects an object related to the received new keyword and updates (or generates) the recognition model, and transmits the updated (or generated) recognition model to the electronic device 101.

An electronic device for controlling displaying according to various embodiments of the present disclosure may include a display unit that receives at least one input keyword, a communication unit that transmits information including the at least one input keyword to a server, a controller that receives, from the server, and installs a recognition model for filtering out an object included in a webpage, determines whether an object corresponding to the input keyword exists in the webpage, and processes the object to be another object, and a display unit that displays a webpage including the processed object.

According to an embodiment of the present disclosure, the controller may set another object corresponding to the keyword so that the object is processed and displayed to be the other object.

According to an embodiment of the present disclosure, the controller may determine a scheme for outputting the webpage when an object to be filtered out exists, and the scheme may include a first scheme that outputs a warning message before displaying the object and a second scheme that displays the other object by replacing the object with the other object, and the scheme may be determined in advance.

According to an embodiment of the present disclosure, when the object exists, the controller may generate a pop-up window that asks whether to block the object, and the display unit may output the generated pop-up window.

According to an embodiment, the controller may determine whether an object corresponding to an advertisement that is not desired by a user exists in the webpage, and may replace the object corresponding to the advertisement with another object or may remove the object.

According to an embodiment of the present disclosure, the controller may install the received recognition model in a web browser in a plug-in manner.

According to an embodiment of the present disclosure, when an input for viewing the object is received in a state in which the other object is displayed, the controller may replace the other object with the object again and display the same in the display unit.

According to an embodiment of the present disclosure, the controller may transmit an input new keyword to the server when a new keyword is input in a state in which the recognition model operates, and may transmit information including a deleted keyword to the server when a previously stored keyword is deleted.

A server that transmits a recognition model for filtering out an object to an electronic device that controls displaying according to various embodiments of the present disclosure may include a communication unit that receives at least one keyword from the electronic device, and a controller that establishes a database by collecting an object related to the received keyword, and generates a recognition model using the collected object, wherein the communication unit transmits the generated recognition model to the electronic device.

According to an embodiment of the present disclosure, the controller may generate the recognition model using at least one of a pattern recognition, a neural network, and a deep learning, based on the collected object.

According to an embodiment of the present disclosure, when a new keyword is received in the state in which the recognition model is transmitted, the controller may collect an object related to the received new keyword to generate a recognition model.

Figure 5:
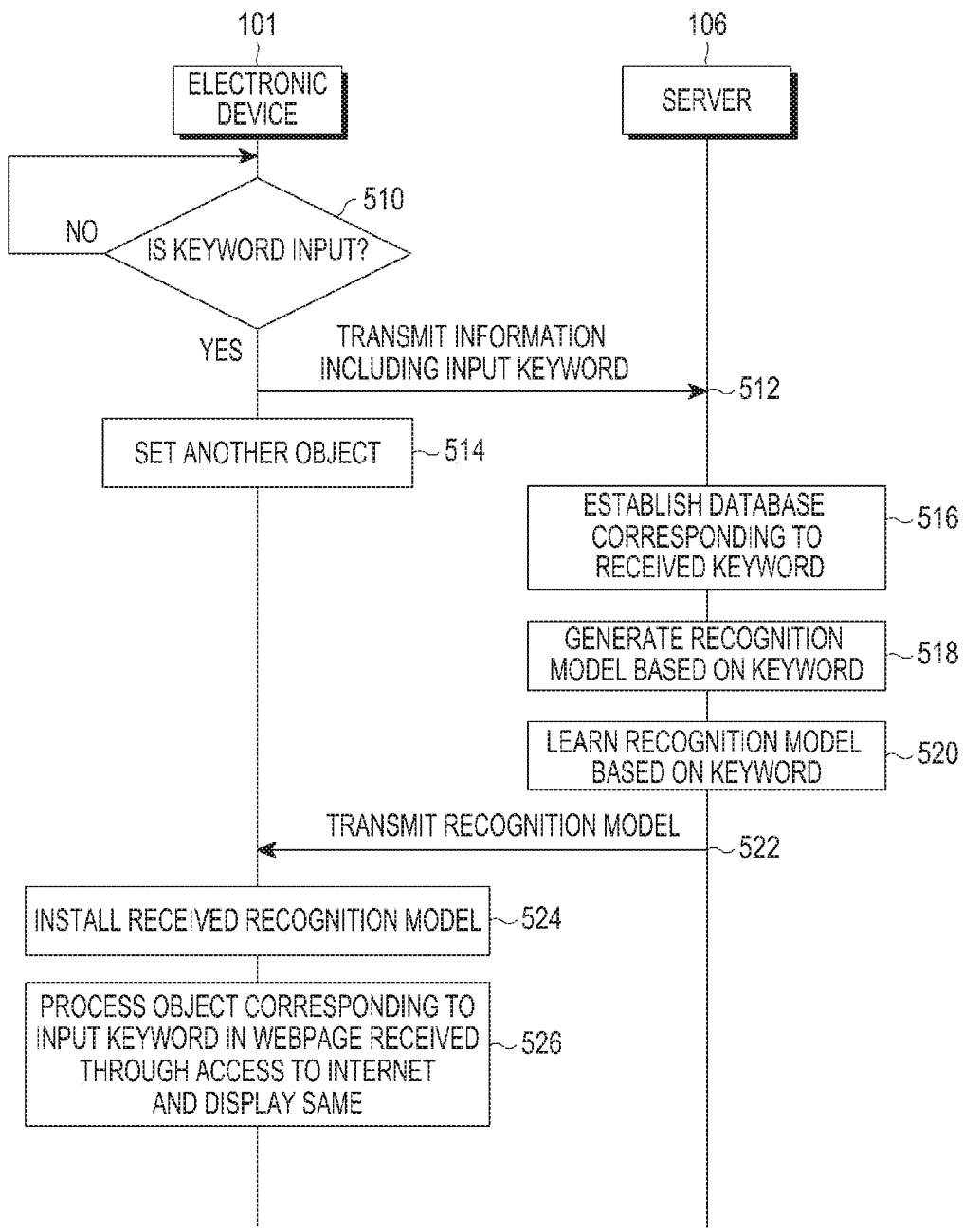
FIG. 5 is a flowchart illustrating an operation process between the electronic device 101 and a server 106 for controlling the displaying of a webpage of the electronic device according to an embodiment of the present disclosure.

FIG. 5 is a flowchart illustrating an operation process between the electronic device 101 and the server 106, for controlling the displaying of a webpage of the electronic device according to an embodiment of the present disclosure.

Hereinafter, referring to FIG. 5, the operation process between the electronic device 101 and the server 106, for controlling the displaying of a webpage of the electronic device according to an embodiment of the present disclosure will be described.

According to various embodiments of the present disclosure, when a keyword associated with an object and a scene that a user does not desire to view is input in operation 510, the electronic device 101 transmits information including the input keyword to the server 106 in operation 512. The electronic device 101 may receive a keyword associated with an undesired object or scene, which is input by the user. The electronic device 101 may determine whether a recognition model corresponding to the input keyword is stored in advance. Subsequently, the user may perform searching on the internet using a web browser prepared in the electronic device 101. The web browser may be an application containing a search engine that is provided for each nation or company, which is used by the user to retrieve information through the internet.

According to various embodiments of the present disclosure, the electronic device 101 sets another object that may replace the object corresponding to the input keyword in operation 514. The electronic device 101 may set an object corresponding to a keyword input in advance, which is included in a retrieval result (e.g., a webpage) obtained through the web browser, to be another object or another object designated in advance. The electronic device 101 may provide the user with a setting process that replaces the object corresponding to the keyword with another object selected in operation 514. For example, when the user does not desire to view an object presenting a spider (e.g., an image, a video, a scene showing that a spider dies or the like) but a webpage received through searching on the internet includes an object corresponding to a spider, the electronic device 101 may process the object to be (or replace the object with) another object set in operation 514.

According to various embodiments of the present disclosure, the server 106 establishes a database corresponding to the keyword included in the information received from the electronic device 101 in operation 516. The server 106 may establish a database by analyzing the information received from the electronic device 101 and mapping at least one keyword received according to an identification number included in the information and a corresponding object. The database may include a plurality of keywords for searching and an object corresponding to each keyword for each electronic device. The server 106 may periodically collect an object corresponding to each keyword, which exists in the internet network.

According to various embodiments of the present disclosure, the server 106 generates a recognition model according to the keyword in operation 518, and learns the recognition model generated based on the keyword in operation 520. The server 106 may generate a recognition model using at least one of a pattern recognition, a neural network, a deep leaning, based on an object collected for each received keyword. The deep learning may be defined as a set of learning algorithms that attempt a high-level abstraction through the combination of various non-linear transform schemes, and may be a branch of machine learning that teaches a user's way of thinking to a computer. With reference to FIG. 4, the controller 440 may periodically or repeatedly learn a generated recognition model through the recognition model learning module 442, and may complete an optimal recognition model. The server 106 may determine the tendency, hobby, or the like of the user of the electronic device 101 through the characteristics of a received keyword, such as a field, a type, or the like. The server 106 may analyze an object that the user prefers or an object that the user does not prefer through a received keyword. The server 106 may apply an analyzed result to generate and learn a recognition model.

According to various embodiments of the present disclosure, the server 106 transmits the recognition model to the electronic device 101 in operation 522. The server 106 may transmit a generated recognition model or a completely learned recognition model to the electronic device 101. The server 106 may control a recognition model to be installed or to operate in a web browser in a plug-in manner, and may transmit the same to the electronic device 101. The server 106 may transmit, to the electronic device 101, each recognition model generated according to a plurality of keywords.

According to various embodiments of the present disclosure, the electronic device 101 installs the recognition model received from the server 106 in operation 524. The electronic device 101 may store a recognition model received from the server 106 in the storage unit 430. The electronic device 101 may install the recognition model received from the server 106 in a plug-in manner. The electronic device 101 may install the recognition model to enable the recognition model to be automatically executed when a web browser is executed or a keyword for searching is input.

According to various embodiments of the present disclosure, the electronic device 101 processes the object corresponding to the input keyword in the webpage received through internet access, and may display the same in operation 526. The electronic device 101 may execute a recognition model when a web browser is executed to access the internet. When an object to be filtered out exists in a webpage retrieved using an executed web browser, the electronic device 101 may determine a scheme of outputting the webpage. The outputting scheme may include a scheme of outputting a warning message before displaying the object and a scheme of replacing the object with another object and displaying the same, and the scheme may be set in advance. When an object corresponding to the input keyword exists in a webpage, the electronic device 101 may generate and output a pop-up window that asks whether to block the object. When an object corresponding to an advertisement that a user does not request or desire is included in the webpage, the electronic device 101 may replace the object corresponding to the advertisement with another object or may remove the object, and display the same. Alternatively, when at least one of an object and a scene that the user does not desire to view is included in the webpage, the electronic device 101 may replace the object with another object and may display the same. When an input for viewing, the object is received from the user in the state in which the webpage including the other object is displayed, the electronic device 101 may replace the other object with the object again, and may display the same. Also, when a new keyword associated with an object that the user does not desire to view is input in the state in which the recognition model is operated, the electronic device 101 transmits the input new keyword to the server, and transmits information including a deleted keyword to the server when a keyword stored in advance is deleted.

A method of controlling displaying in an electronic device according to various embodiments of the present disclosure may include, transmitting information including at least one input keyword to a server, receiving, from the server, a recognition model for filtering out an object included in a received webpage, and installing the recognition model, determining whether an object corresponding to the input keyword exists in the webpage, and processing the object to be another object and providing displaying.

According to an embodiment of the present disclosure, the method may further include setting another object corresponding to the keyword so that the object is processed and displayed to be the other object.

According to an embodiment, the method may further include determining a scheme of outputting the webpage when the object to be filtered out exists.

According to an embodiment of the present disclosure, the outputting scheme may include a scheme of outputting a warning message before displaying the object, and a scheme of replacing the object with another object and displaying the same, and the scheme may be set in advance.

According to an embodiment of the present disclosure, the method may further include outputting a pop-up window that asks whether to block the object when the object exists.

According to an embodiment of the present disclosure, the method may further include: when an object corresponding to an advertisement that is not desired by a user exists in the webpage, replacing the object corresponding to the advertisement with another object, or removing the object.

According to an embodiment of the present disclosure, the other object is an object set to correspond to the keyword or an object set in advance.

According to an embodiment of the present disclosure, the received recognition model may be installed in a web browser in a plug-in manner.

According to an embodiment, the keyword may be input for filtering, in advance, a webpage including at least one of an object and scene that a user does not desire to view.

According to an embodiment of the present disclosure, the method further includes: when an input for viewing, the object is received in the state in which the other object is displayed, replacing the other object with the object again and displaying the same.

According to an embodiment of the present disclosure, the information may be transmitted for generating a personalized recognition model, and may include the keyword and an identification number of the electronic device.

According to an embodiment of the present disclosure, the method may further include: transmitting an input new keyword to the server when a new keyword is input in a state in which the recognition model operates, and transmitting information including a deleted keyword to the server when a previously stored keyword is deleted.

According to an embodiment of the present disclosure, the recognition model may operate to determine whether an object corresponding to the input keyword exists in the webpage using at least one of a pattern recognition, a neural network, and a deep learning.

A method for a server to transmit a recognition model for filtering out an object included in the webpage to an electronic device that controls displaying according to various embodiments of the present disclosure may include: receiving at least one keyword from the electronic device; establishing a database by collecting an object related to the received keyword, generating a recognition model using the collected object, and transmitting the generated recognition model to the electronic device.

According to an embodiment of the present disclosure, the operation of generating the recognition model may include generating the recognition model using at least one of a pattern recognition, a neural network, and a deep learning, based on the collected object.

According to an embodiment of the present disclosure, the method may further include, when a new keyword is received from the electronic device in the state in which the recognition model is transmitted, collecting an object related to the received new keyword and updating the recognition model.

Figure 6:
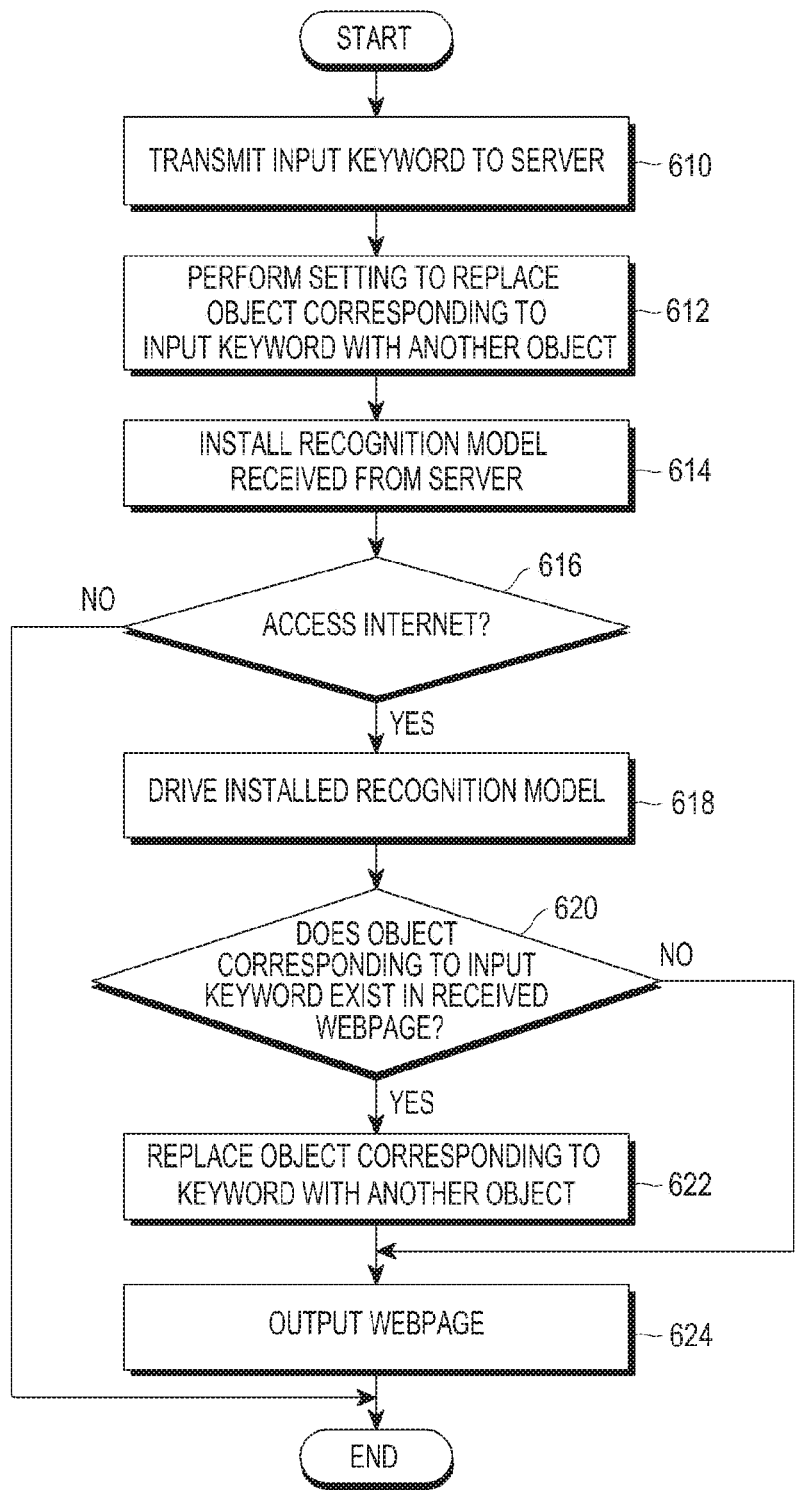
FIG. 6 is a flowchart illustrating a process in which an electronic device displays a webpage according to an embodiment of the present disclosure.

FIG. 6 is a flowchart illustrating a process in which an electronic device displays a webpage according to an embodiment of the present disclosure.

Hereinafter, referring to FIG. 6, a process in which an electronic device according to an embodiment of the present disclosure displays a webpage will be described as follows.

According to various embodiments of the present disclosure, the electronic device 101 transmits an input keyword to the server 106 in operation 610. The electronic device 101 may receive a keyword associated with at least one of an undesired object and an undesired scene, which is input by a user. The electronic device 101 may transmit information including an input keyword and the identification number of the electronic device 101 to the server 106.

According to various embodiments of the present disclosure, the electronic device 101 receives, from the user, the input of a setting for replacing the object corresponding to the keyword with another object in operation 612. The electronic device 101 may set the object corresponding to the input keyword to be another object or another object designated in advance. The electronic device 101 may provide the user with a function (e.g., a menu) for presenting a setting process that replaces the object corresponding to the input keyword with another object. The electronic device 101 may ask the user whether to display a webpage including the object corresponding to the keyword as it is, whether to replace the object corresponding to the keyword with another object for displaying a webpage, or whether to replace the object corresponding to the keyword with another object designated in advance, and perform setting by reflecting the same.

According to various embodiments of the present disclosure, the electronic device 101 installs a recognition model received from the server in operation 614. The electronic device 101 may store or install, in the storage unit 430, a recognition model received based on at least one keyword transmitted to the server 106. The electronic device 101 may install the received recognition model in a web browser in a plug-in manner. The electronic device 101 may install the recognition model to enable the recognition model to be automatically executed when a web browser is executed.

According to various embodiments of the present disclosure, when the electronic device 101 accesses the internet in operation 616, the electronic device 101 drives the installed recognition model in operation 618. Alternatively, when a web browser is executed, the electronic device 101 may execute the recognition model. The electronic device 101 may drive the installed recognition model in response to the execution of a web browser for the access to the internet. Alternatively, when a web browser is executed to access the internet and searching is performed on the internet, the electronic device 101 may execute the recognition model.

According to various embodiments of the present disclosure, when an object corresponding to the input keyword exists in the received internet page in operation 620, the electronic device 101 replaces the object corresponding to the keyword with another object in operation 622. The electronic device 101 may receive a word (or keyword), a sentence, or the like, which is input by the user for searching on the internet, through the web browser. The electronic device 101 may determine whether an object corresponding to the input keyword is included in a webpage that includes various pieces of information associated with the input word or sentence. The electronic device 101 may configure a webpage to be output by replacing an object corresponding to a keyword input in advance with another object, or may configure a webpage to be output by replacing the object corresponding to the keyword input in advance with another object designated in advance. Alternatively, the electronic device 101 may generate a pop-up window that asks a user whether to output the object, and may output the pop-up window before outputting the webpage including the object.

According to various embodiments of the present disclosure, when an object to be filtered out exists in a received webpage, the electronic device 101 may determine a scheme of outputting the webpage. The outputting scheme may include a scheme of outputting a warning message before displaying the object and a scheme of replacing the object with another object and displaying the same, and the scheme may be set in advance. When the object corresponding to the input keyword exists in the webpage, the electronic device 101 may generate a pop-up window that asks whether to block the object. Alternatively, when an object corresponding to an advertisement that the user does not request or desire exists in the webpage, the electronic device 101 may replace the object corresponding to the advertisement with another object, or may remove the object. Alternatively, when at least one of an object and a scene that the user does not desire to view exists in the webpage, the electronic device 101 may replace the object with another object. When an input for viewing, the object is received from the user in the state in which the webpage including the other object is displayed, the electronic device 101 may replace the other object with the object again.

According to various embodiments of the present disclosure, the electronic device 101 outputs a webpage including the other object obtained through the replacement in operation 624. According to a type of object or the number of objects included in the webpage, the electronic device 101 may display a webpage including an object corresponding to the keyword as it is, may replace the object corresponding to the keyword with another object for displaying a webpage, or may display a pop-up window including information for asking the user whether to replace the object corresponding to the keyword with another object designated in advance for displaying a webpage.

FIGS. 7A, 7B, 7C, 7D, and 7E are diagrams illustrating a process in which an electronic device replaces an object included in a received webpage with another object, and displays a webpage according to various embodiments of the present disclosure.

Figure 7:
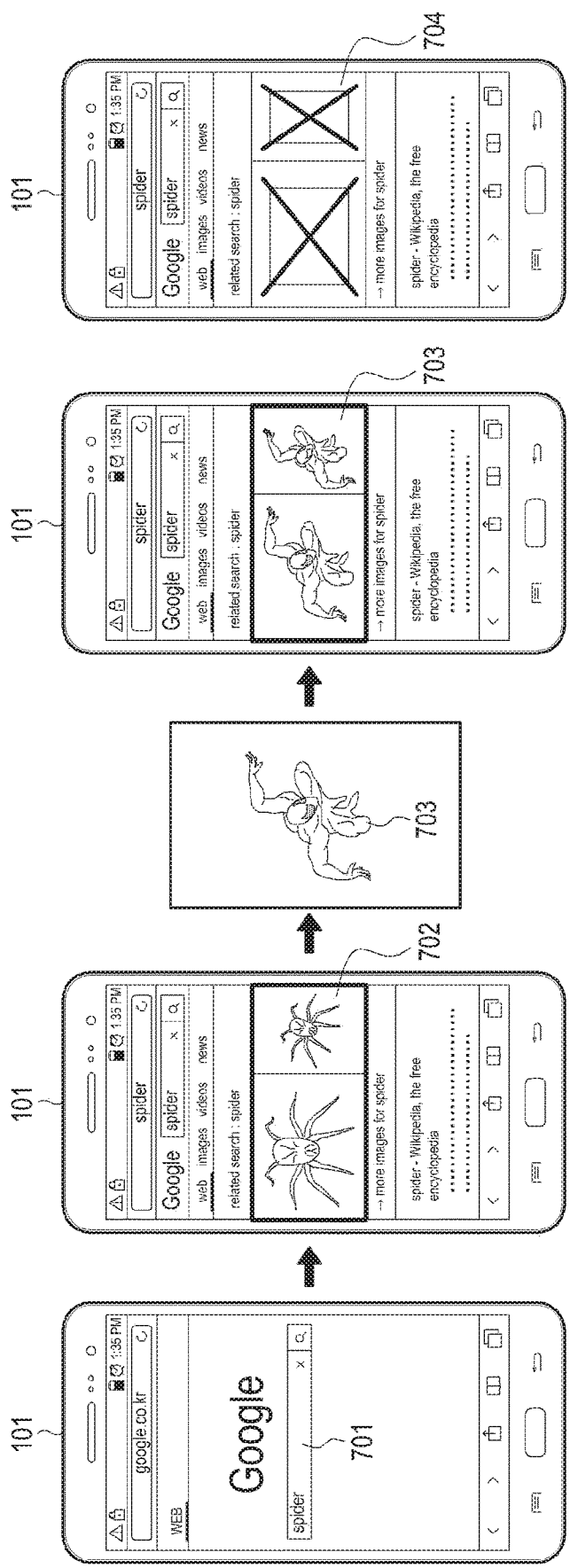
FIG. 7A is a diagram illustrating an example of inputting a keyword through a web browser according to an embodiment of the present disclosure.
FIG. 7B is a diagram illustrating a webpage that includes at least one object corresponding to an input keyword and is not yet shown to a user according to an embodiment of the present disclosure.
FIG. 7C is a diagram illustrating another object that is to replace an object corresponding to a keyword according to an embodiment of the present disclosure.
FIG. 7D is a diagram illustrating an example of replacing an object corresponding to a keyword with another object and outputting the same according to an embodiment of the present disclosure.
FIG. 7E is a diagram illustrating an example of replacing an object corresponding to a keyword with another object designated in advance and outputting the same according to an embodiment of the present disclosure.

FIG. 7A is a diagram illustrating an example of inputting a keyword through a web browser according to an embodiment of the present disclosure. FIG. 7B is a diagram illustrating a webpage that includes at least one object corresponding to an input keyword and is not yet shown to a user, according to an embodiment of the present disclosure. FIG. 7C is a diagram illustrating another object that is to replace an object corresponding to a keyword according to an embodiment of the present disclosure. FIG. 7D is a diagram illustrating an example of replacing an object corresponding to a keyword with another object and outputting the same according to an embodiment of the present disclosure. FIG. 7E is a diagram illustrating an example of replacing an object corresponding to a keyword with another object designated in advance and outputting the same according to an embodiment of the present disclosure.

Referring to FIGS. 7A to 7E, when a user desires to obtain desired information through the internet, the electronic device 101 may execute a web browser for receiving a keyword for searching, and the user may input a keyword for searching through a search box 701. The search box 701 may receive at least one input keyword, and the web browser may search for a webpage corresponding to at least one input keyword through the internet network. The electronic device 101 may determine whether at least one object 702 corresponding to the input keyword exists in the webpage before outputting the retrieved webpage to the user. As described above, when the webpage includes the at least one object 702 corresponding to the input keyword, the electronic device 101 may replace the object 702 with another object 703, and may output a webpage including the other object 703 to the display unit 435 of the electronic device 101 as illustrated in FIG. 7D. Alternatively, as illustrated in FIG. 7E, the electronic device 101 may replace the object 702 with another object 704 designated in advance, and may output a webpage including the other object 704 designated in advance to the display unit 435 of the electronic device 101. The other object 703 and the other object 704 designated in advance may be objects that a user designates in advance, or objects that are randomly selected by the electronic device 101.

Figure 8:
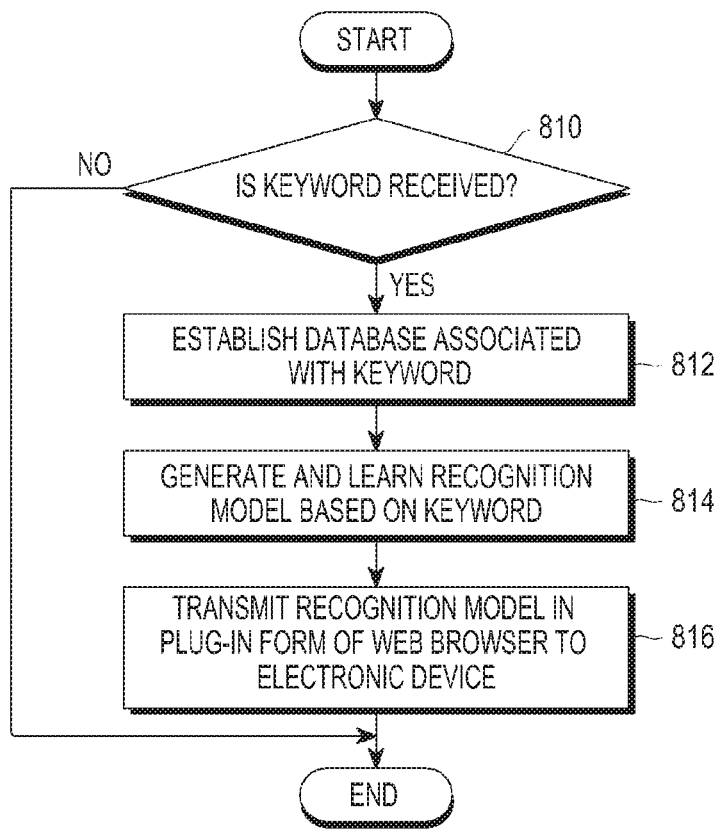
FIG. 8 is a flowchart illustrating a process in which a server transmits a recognition model for filtering out an object included in a webpage to an electronic device according to an embodiment of the present disclosure.

FIG. 8 is a flowchart illustrating a process in which a server transmits a recognition model for filtering out an object included in a webpage to an electronic device according to an embodiment of the present disclosure.

Hereinafter, referring to FIG. 8, a process in which a server according to an embodiment of the present disclosure transmits a recognition model that filters out an object included in a webpage to an electronic device will be described in detail.

According to various embodiments of the present disclosure, when a keyword is received from the electronic device 101 in operation 810, the server 106 may establish a database associated with the keyword in operation 812. The server 106 may receive at least one input keyword from at least one electronic device. The server 106 may receive information including an identification number of the electronic device 101 and at least one input keyword from the electronic device 101. The server 106 may establish a database corresponding to each keyword included in the information received from the electronic device 101. The server 106 may establish a database by analyzing the information received from the electronic device 101, and mapping at least one keyword received according to an identification number included in the information and a corresponding object. The database may include a plurality of keywords for searching and an object corresponding to each keyword for each electronic device. The server 106 may periodically collect an object corresponding to each keyword, which exists in the internet network.

According to various embodiments of the present disclosure, the server 106 generates and learns a recognition model according to a keyword in operation 814. The server 106 may generate a recognition model according to a keyword, and may learn the recognition model generated according to the keyword. The server 106 may generate a recognition model using at least one of a pattern recognition, a neural network, a deep leaning, based on an object collected for each received keyword. The server 106 may generate a recognition model for each electronic device that transmits at least one keyword. The server 106 may periodically or repeatedly learn a generated recognition model through the recognition model learning module 442, and may complete an optimal recognition model. The server 106 may determine the tendency, hobby, or the like of the user of the electronic device 101 through the characteristics of a received keyword, such as a field, a type, or the like. The server 106 may analyze an object that the user prefers or an object that the user does not prefer through a received keyword. The server 106 may apply an analyzed result to generate and learn a recognition model.

According to various embodiments of the present disclosure, the server 106 may transmit, to the electronic device 101, a recognition model in the form of a plug-in of a web browser in operation 816. The server 106 may transmit a generated recognition model or a completely learned recognition model to the electronic device 101. The server 106 may transmit, to the electronic device 101, a recognition model by controlling the recognition model to be installed or operated in a web browser in a plug-in manner. The server 106 may transmit, to the electronic device 101, each recognition model generated according to a plurality of keywords.

Figure 9:
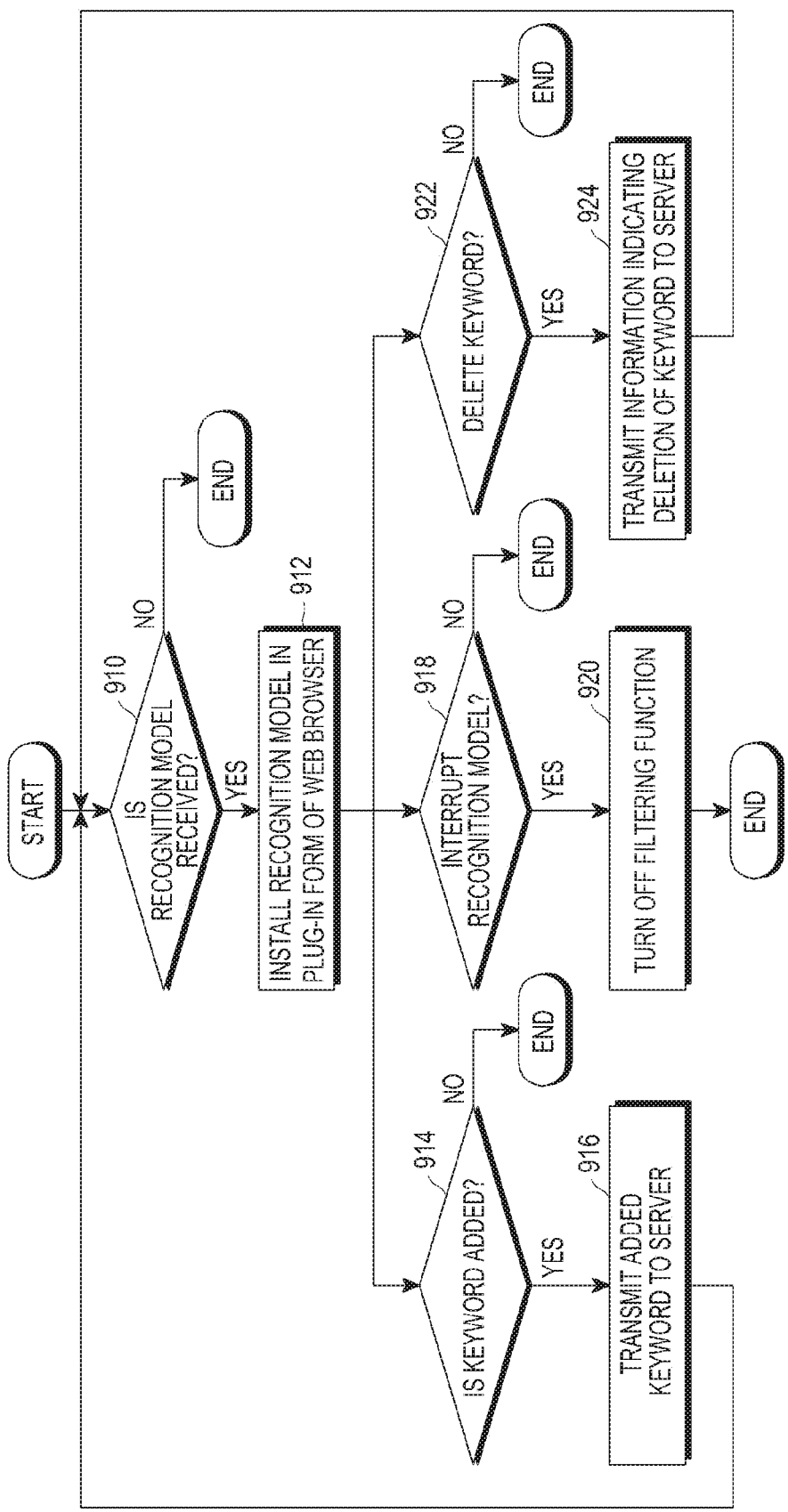
FIG. 9 is a flowchart illustrating various examples for controlling a recognition model installed in an electronic device according to an embodiment of the present disclosure.

FIG. 9 is a flowchart illustrating various examples for controlling a recognition model installed in an electronic device according to an embodiment of the present disclosure.

Hereinafter, referring to FIG. 9, various examples of controlling a recognition model installed in an electronic device according to an embodiment of the present disclosure will be described as follows.

According to various embodiments of the present disclosure, when a recognition model is received from the server 106 in operation 910, the electronic device 101 installs a received recognition model in a plug-in manner in operation 912 so that the recognition model interoperates with a web browser. The electronic device 101 may store or install, in the storage unit 430, at least one recognition model received from the server 106. The electronic device 101 may transmit information including at least one input keyword to the server 106, may receive a recognition model for filtering out an object included in a received webpage based on the keyword, and may install the recognition model in a plug-in manner to enable the recogOnition model to interoperate with a web browser. The electronic device 101 may install the recognition model to be automatically executed when a web browser is executed.

According to various embodiments, when a new keyword is added in addition to a keyword that is input and stored in advance in operation 914, the electronic device 101 transmits the added keyword to the server in operation 916. When a new keyword is input in the state in which the recognition model operates or when the recognition model does not operate, the electronic device 101 may transmit the input new keyword to the server 106, may receive a recognition model corresponding to the new keyword from the server 106, and may install the received recognition model. Alternatively, the electronic device 101 may update the recognition model based on the new keyword.

According to various embodiments of the present disclosure, when an instruction for interrupting the installed recognition model is input, in operation 918, the electronic device 101 may interrupt the installed recognition model in operation 920. The electronic device 101 may temporarily interrupt a filtering function of the recognition model in response to the input of the instruction for temporarily interrupting the installed recognition model. The electronic device 101 may temporarily interrupt the filtering function in response to the input of the instruction that requests the temporal interruption of a filtering function provided to the recognition model. Although the filtering function is temporarily interrupted, the recognition model may perform at least one of the remaining functions. The recognition model may be interrupted when the recognition model is inappropriate for a user of the electronic device 101, or may be interrupted to prevent an inappropriate object from being provided to the user. For example, when the user of the electronic device 101 is a minor, the parents of the minor may not desire to provide an in appropriate object (e.g., a gaudy banner advertisement, a gaudy scene, a cruel scene, or the like) to their child. In this instance, a recognition model may provide a function of filtering out the inappropriate object so as not to provide the inappropriate object to the child. The function may be basically provided by the manufacturer of the electronic device 101 or may be set by a user. The electronic device 101 may remove a recognition model selected out of at least one recognition model stored in the storage unit 430. A recognition model according to various embodiments of the present disclosure may be stored in the storage unit 430 by being grouped based on a field of an input keyword, or each recognition model may be separately stored. A list of at least one recognition model may be stored in the form of a table. In association with a recognition mode, a filtering function may be interrupted or removed, and a keyword may be added or removed.

According to various embodiments of the present disclosure, when an instruction for removing a keyword that is input and stored in advance is input in operation 922, the electronic device 101 transmits information indicating the removal of the input keyword to the server in operation 924. The electronic device 101 may store keywords input up to date in the storage unit 430 in the form of a table, and may manage the same. Also, the electronic device 101 may map a recognition model corresponding to each keyword to a corresponding keyword in the form of a table, and may mange the same. By request from a user, a list of a plurality of keywords stored in the storage unit 430 may be output to the display unit 435. The table may include information associated with whether a recognition model exists, is installed, and is updated for each keyword, and may include data obtained by classifying keywords based on a field or type.

Figure 10:
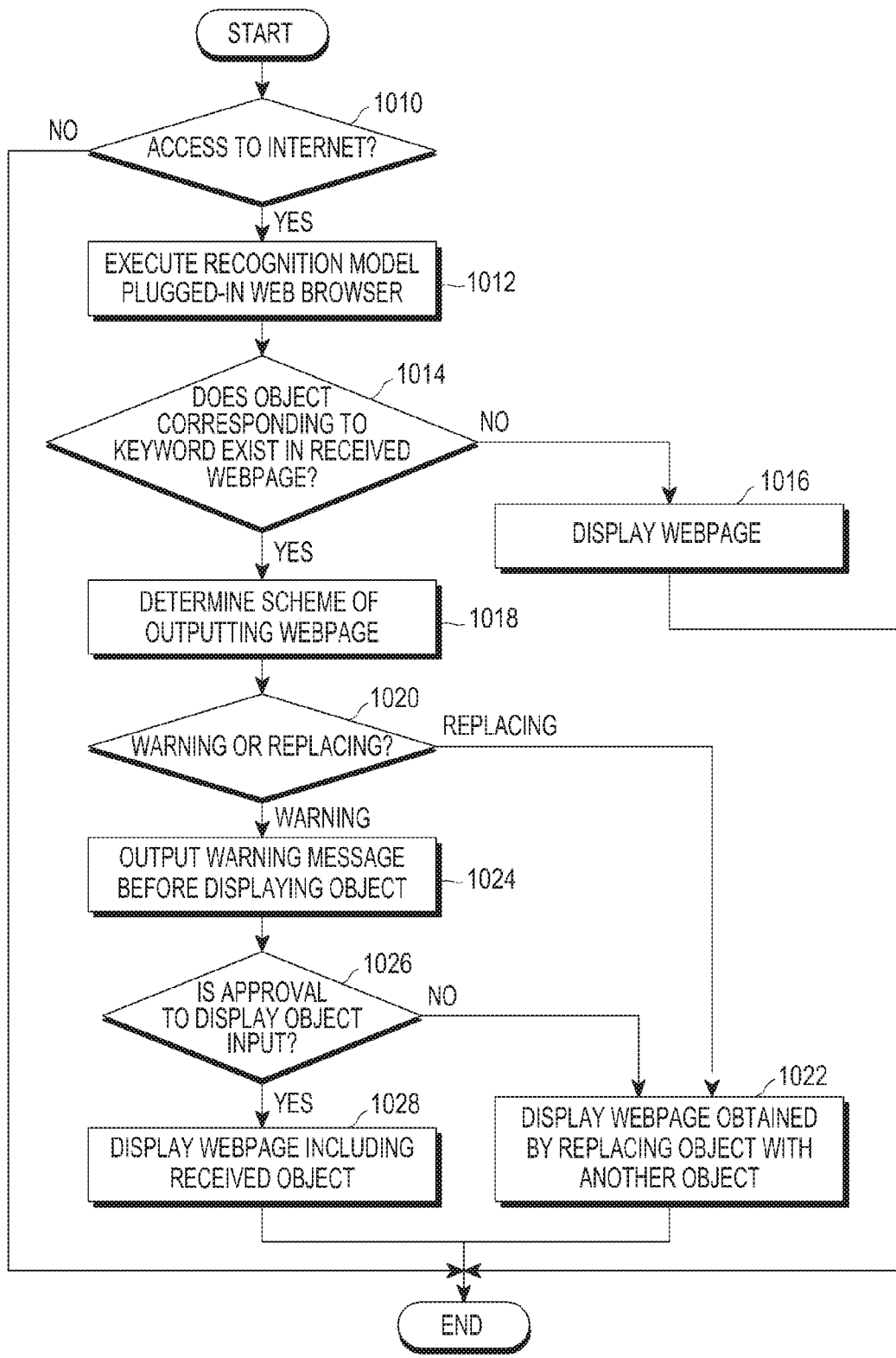
FIG. 10 is a flowchart illustrating various examples of outputting a webpage in an electronic device according to an embodiment of the present disclosure.

FIG. 10 is a flowchart illustrating various examples of outputting a webpage in an electronic device according to an embodiment of the present disclosure.

Hereinafter, referring to FIG. 10, various examples in which an electronic device according to an embodiment of the present disclosure outputs a webpage will be described as follows.

According to various embodiments of the present disclosure, when the electronic device 101 accesses the internet in operation 1010, the electronic device 101 executes a recognition model plugged-in web browser in operation 1012. When the electronic device 101 accesses the internet, the electronic device 101 may drive the installed recognition model plugged-in web browser. Alternatively, when a web browser is executed, the electronic device 101 may execute a recognition model. The electronic device 101 may drive the installed recognition model in response to the execution of a web browser for the access to the internet. Alternatively, when a web browser is executed for the access to the internet, and a word or a sentence for searching is input, the electronic device 101 may execute a recognition model corresponding to the input word or sentence. The electronic device 101 may determine whether an object corresponding to a keyword input in advance exists in a webpage, before displaying, in the display unit 435, the webpage received through the searching.

According to various embodiments of the present disclosure, when a result obtained through searching on the internet using the executed web browser shows that an object corresponding to the keyword input in advance does not exist in the received webpage in operation 1014, the electronic device 101 may display the received webpage in the display unit 435 in operation 1016. The electronic device 101 may determine whether at least one object exists in the webpage, before displaying the webpage in the display unit 435. The electronic device 101 may determine an object that corresponds to the keyword input in advance or an object that does not correspond to the keyword input in advance from among the at least one object. Alternatively, the electronic device 101 may output a pop-up window that asks whether to set a keyword in association with (or whether to display) at least one object that does not correspond to a keyword input in advance. For example, when an object corresponding to a keyword input in advance exists in the received webpage, the electronic device 101 may output a pop-up window that asks whether to filter out the corresponding object, and receives a result associated with whether to perform filtering from a user.

According to various embodiments of the present disclosure, when the object corresponding to the keyword input in advance exists in the webpage received through the executed web browser in operation 1014, the electronic device 101 determines a scheme of outputting the webpage in operation 1018. The electronic device 101 may determine a scheme of outputting each object included in a webpage. The outputting scheme may include a scheme of outputting a warning message before displaying the object, and a scheme of replacing the object with another object and displaying the same. The scheme may be set in advance or may be determined after asking the user before displaying the object. Alternatively, when it is determined that an object corresponding to a keyword exists in a webpage, the electronic device 101 may generate a pop-up window that asks whether to block the object, and may output the generated pop-up window to the display unit 435 to enable the user to determine an output scheme. The pop-up window may include information for asking the user whether to display the webpage including the object corresponding to the keyword as it is, whether to replace the object corresponding to the keyword with another object for displaying a webpage, or whether to replace the object corresponding to the keyword with another object designated in advance for displaying a webpage.

According to various embodiments of the present disclosure, when it is determined that the scheme determined in operation 1018 is a scheme of replacing an object corresponding to a keyword with another object in operation 1020, the electronic device 101 replaces the object with another object and displays a webpage in operation 1022. When the object corresponding to the input keyword exists in the webpage that includes various pieces of information, the electronic device 101 may configure a webpage to be output by replacing the object corresponding to the keyword with another object, or may configure a webpage to be output by replacing the object corresponding to the keyword with another object designated in advance. The webpage may be displayed by replacing, with another object, an object corresponding to a keyword input in advance in addition to an object corresponding to a keyword input after accessing the internet in operation 1010.

According to various embodiments of the present disclosure, when the scheme is a scheme for outputting a warning message, the electronic device 101 outputs a warning message to enable the user to recognize that the object corresponding to the keyword is included, before displaying the webpage including the object in operation 1024. The warning may include a voice message or vibration in order to enable the user to be aware of an object included in the webpage. The user may recognize the warning message, and may recognize that an undesired object is included in the webpage. The input/output unit 425 may output a warning message to enable the user to recognize the warning message at the same time as or before/after the input/output unit 425 displays a pop-up window that asks whether to block the object included in the webpage in the display unit 435.

According to various embodiments of the present disclosure, when a user input on the basis of the output warning message is an input for replacing the object with another object and displaying a webpage, the electronic device 101 may replace the object with another object and displays a webpage in operation 1022. The warning message may include information for asking the user whether to display a webpage including an object corresponding to the keyword as it is, whether to replace the object corresponding to the keyword with another object for displaying a webpage, or whether to replace the object corresponding to the keyword with another object designated in advance for displaying a webpage. In the case in which an object (e.g., a picture, a video, an advertisement, or the like) that a user does not desire to view is included in a webpage, when the user does not allow to display the undesired object, the electronic device 101 may replace the object with another object and display a webpage.

According to various embodiments of the present disclosure, when the user input on the basis of the output warning message is an input for displaying the object in operation 1026, the electronic device 101 may display the received webpage including the object in operation 1028. When the user input is an input for displaying the object, the electronic device 101 may configure a webpage to be output by replacing the object corresponding to the keyword with another object or may configured a webpage to be output by replacing the object corresponding to the keyword with another object designated in advance, and may display the configured webpage. The electronic device 101 may replace the object corresponding to the keyword with another object based on a type of object or the number of objects included in a webpage, and may display a webpage.

Figure 11:
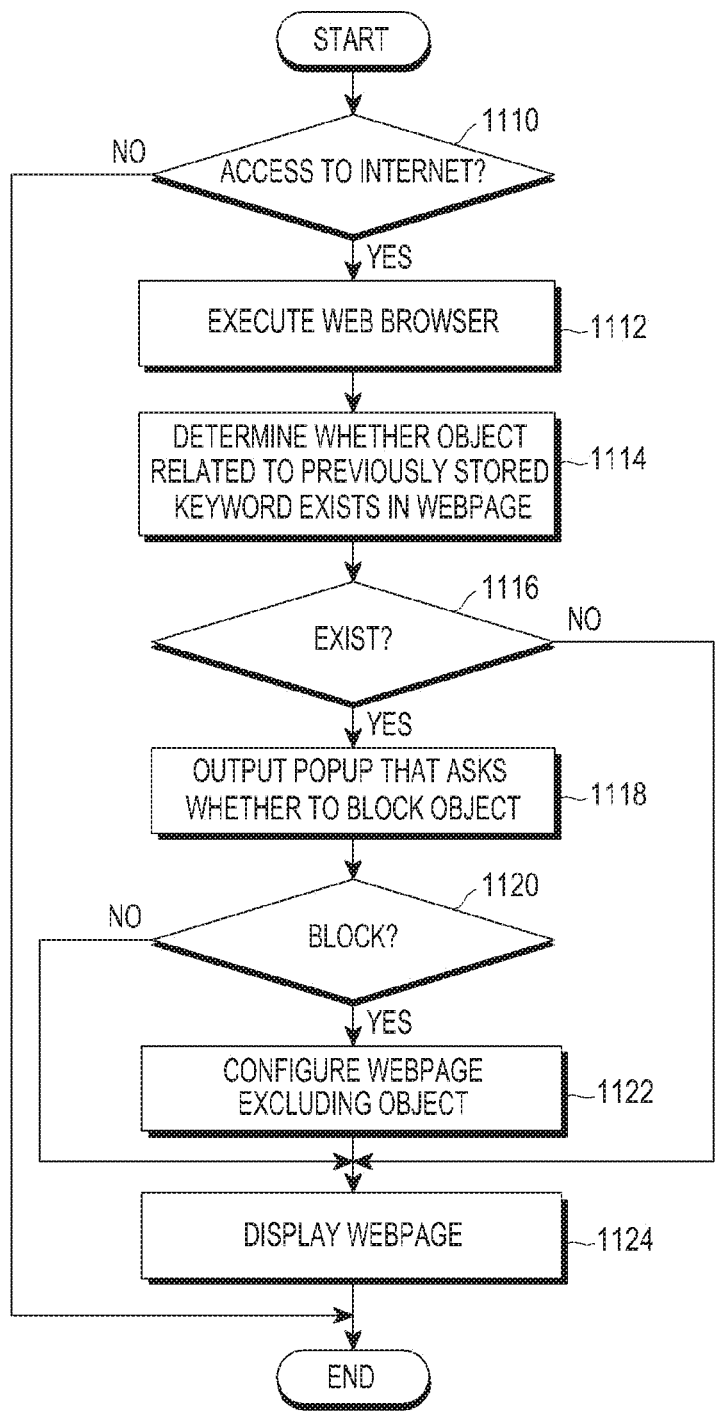
FIG. 11 is a flowchart illustrating a process of controlling outputting of an object included in a webpage in an electronic device according to an embodiment of the present disclosure.

FIG. 11 is a flowchart illustrating a process of controlling outputting of an object included in a webpage in an electronic device according to an embodiment of the present disclosure.

Hereinafter, referring to FIG. 11, a process in which an electronic device according to an embodiment of the present disclosure controls outputting an object included in a webpage will be described in detail as follows.

According to various embodiments of the present disclosure, when the electronic device 101 desires to access the internet in operation 1110, the electronic device 101 executes a web browser in operation 1112. When the electronic device 101 desires to access the internet, the electronic device 101 may execute a recognition model plugged-in web browser. When the electronic device 101 accesses the internet, the electronic device 101 may drive the installed recognition model plugged-in web browser. Alternatively, when the browser is executed, the electronic device 101 may execute a recognition model. The electronic device 101 may drive the installed recognition model in response to the execution of a web browser for the access to the internet. Alternatively, when the electronic device 101 executes a web browser to access the internet and a keyword for searching is input, a recognition model corresponding to the input keyword may be executed. A user may input various keywords for searching, such as a word, a sentence, or the like, through the executed web browser.

According to various embodiments of the present disclosure, the electronic device 101 determines whether an object related to a keyword stored in advance exists in a webpage received in response to the keyword input through the executed web browser in operation 1114. The electronic device 101 may determine whether an object corresponding to keywords input up to date exists in the received webpage, and may recognize the type of object and the number of objects. The electronic device 101 may determine whether another object exists, in addition to an object corresponding to the keyword input in advance exists in the received webpage.

According to various embodiments of the present disclosure, when an object corresponding to the keyword input in advance does not exist in the webpage received in response to the keyword input through the executed web browser in operation 1114, the electronic device 101 displays the received webpage in the display unit 435 in operation 1124. Also, the electronic device 101 may determine an object that corresponds to the keyword or an object that does not correspond to the keyword from among at least one object included in the webpage. Alternatively, the electronic device 101 may output a pop-up window that asks whether to add a recognition module with respect to at least one object that does not correspond to the keyword.

According to various embodiments of the present disclosure, when the object corresponding to the keyword input in advance exists in the webpage received through the executed web browser in operation 1116, the electronic device 101 may output a pop-up window that asks whether to block the object in operation 1118. When it is determined that the object corresponding to the keyword exists in the webpage, the electronic device 101 may generate the pop-up window that asks whether to block the object, and may output the generated pop-up window to the display unit 435. The pop-up window may include information for asking the user whether to display the webpage including the object corresponding to the keyword as it is, whether to replace the object corresponding to the keyword with another object for displaying a webpage, whether to replace the object corresponding to the keyword with another object designated in advance for displaying a webpage, or whether to display only a webpage excluding the object corresponding to the keyword.

According to various embodiments of the present disclosure, when an input for blocking the object is received through the output pop-up window in operation 1120, the electronic device 101 configures a webpage excluding the object in operation 1122. The pop-up window may be repeatedly displayed based on the number of objects, or a single pop-up window may display a list of objects to be blocked. The electronic device 101 may determine whether a corresponding object exists in a webpage based on all keywords that input in advance, and may output a pop-up window. When an instruction to block, the object is input, the electronic device 101 may configure a webpage excluding the object.

According to various embodiments of the present disclosure, when an input for blocking the object is not received through the output pop-up window in operation 1120, the electronic device 101 configures a webpage including the object and displays the same in operation 1122 and 1124. The electronic device 101 displays the webpage in operation 1124. The electronic device may reconfigure the webpage including various pieces of information associated with an input keyword to be a webpage excluding the object corresponding to the input keyword. The electronic device 101 may display the reconfigured webpage. The webpage may be a webpage obtained by excluding the object corresponding to the keyword input through the access to the internet in operation 1110 and the object corresponding to the keyword input in advance. When an input for viewing, the object is received through the pop-up window, the controller 410 may replace the other object with the object. When it is detected that a new keyword is input in the state in which a recognition model corresponding to a keyword input in advance drives, the controller 410 may transmit the input new keyword to the server. Also, when a request for deleting a predetermined keyword is received from the user, the controller 410 may transmit the requested keyword to the server.

Figure 12:
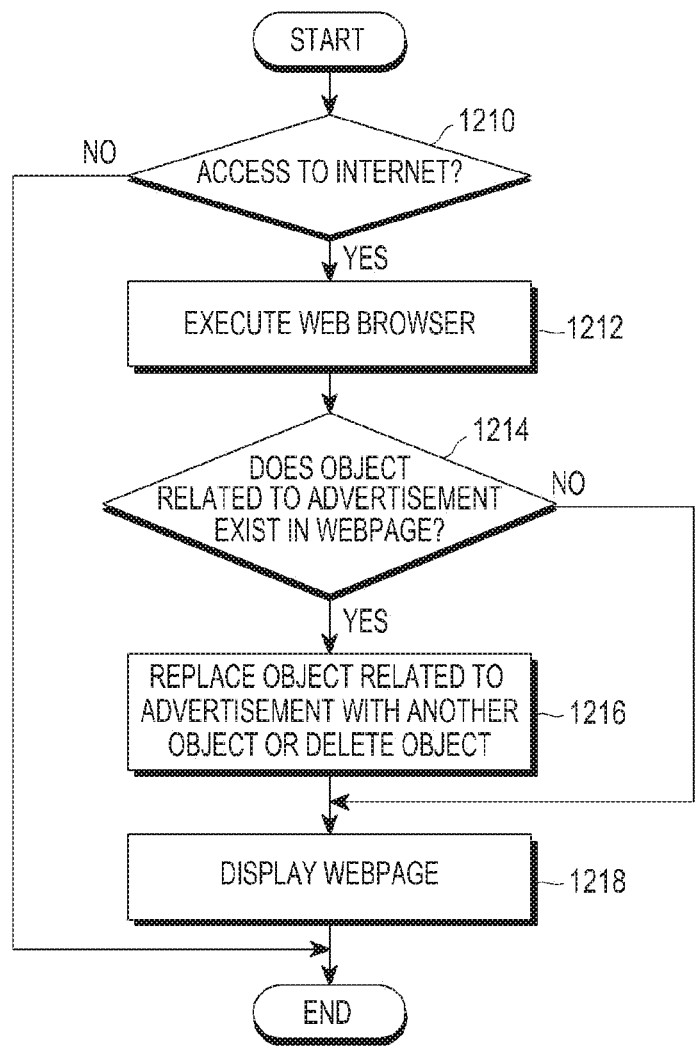
FIG. 12 is a flowchart illustrating a process of controlling outputting of an object included in a webpage in an electronic device according to an embodiment of the present disclosure.

FIG. 12 is a flowchart illustrating a process of controlling outputting of an object included in a webpage in an electronic device according to an embodiment of the present disclosure.

Hereinafter, referring to FIG. 12, a process in which an electronic device according to other embodiments of the present disclosure controls outputting of an object included in a webpage will be described in detail as follows.

According to various embodiments of the present disclosure, when the electronic device 101 accesses the internet in operation 1210, the electronic device 101 executes a web browser in operation 1212. When the electronic device 101 accesses the internet, the electronic device 101 may execute a recognition model plugged-in web browser. When the electronic device 101 accesses the internet, the electronic device 101 may drive the installed recognition model plugged-in web browser. Alternatively, when the browser is executed, the electronic device 101 may execute a recognition model. The electronic device 101 may drive the installed recognition model in response to the execution of a web browser for the access to the internet. Alternatively, when the web browser is executed to access the internet and a keyword for searching is input, the electronic device 101 may execute a recognition model. A user may input a keyword for searching through the executed web browser.

According to various embodiments of the present disclosure, the electronic device 101 determines whether an object related to an advertisement exists in a webpage received in response to the keyword input through the executed web browser in operation 1214. The electronic device 101 may analyze characteristics of various objects included in the webpage, and may determine whether an object corresponds to the input keyword or is related to an advertisement (e.g., a banner advertisement), for each object. For example, the electronic device 101 may determine whether an object included in the webpage corresponds to the input keyword or is related to an advertisement (e.g., a banner advertisement), based on the recognition model received from the server 106.

According to various embodiments of the present disclosure, when an object corresponding to an advertisement does not exist in the webpage received in response to the keyword input through the executed browser in operation 1214, the electronic device 101 displays the received webpage in the display unit 435 in operation 1218. Also, the electronic device 101 may analyze various objects included in the webpage, and may determine an object that does not correspond to the keyword. Alternatively, the electronic device 101 may output a pop-up window that asks whether to display at least one object that does not correspond to the keyword.

According to various embodiments of the present disclosure, when the object corresponding to the advertisement exists in the webpage received through the executed web browser in operation 1214, the electronic device 101 replaces the object related to the advertisement with another object or removes the object in operation 1216. When it is determined that the object corresponding to the advertisement exists in the webpage, the electronic device 101 may configure a webpage by replacing the object with another object. Alternatively, when it is determined that the object corresponding to the advertisement exists in the webpage, the electronic device 101 may configure a webpage by removing the object. Alternatively, when it is determined that the object corresponding to the advertisement exists in the webpage, the electronic device 101 generates a pop-up window that asks whether to replace the object with another object or to remove the object, and outputs the generated popup window to the display unit 435. The popup window may include information for asking the user whether to display the webpage including the object corresponding to the advertisement as it is, whether to replace the object corresponding to the advertisement with another object for displaying a webpage, whether to replace the object corresponding to the advertisement with another object designated in advance for displaying a webpage, or whether to display a webpage obtained by removing the object corresponding to the advertisement. The electronic device 101 may configure a webpage to correspond to a selection input by the user through the popup window. For example, when a user input is received for displaying the webpage including the object corresponding to the advertisement as it is, the electronic device 101 may configure a webpage including the object corresponding to the advertisement. For example, when a user input for displaying a webpage obtained by replacing the object corresponding to the advertisement with another object is received, the electronic device 101 may configure a webpage by replacing the object corresponding to the advertisement with another object. For example, when a user input for displaying a webpage obtained by replacing the object corresponding to the advertisement with another object designated in advance is received, the electronic device 101 may configure a webpage by replacing the object with another object designated in advance. For example, when a user input for displaying a webpage obtained by removing the object corresponding to the advertisement is received, the electronic device 101 may configure a webpage by removing the object corresponding to the advertisement.

According to various embodiments of the present disclosure, the electronic device 101 displays a webpage in operation 1218. For example, when a user input is an input for displaying a webpage including an advertisement as it is, the electronic device 101 may display a webpage including an object corresponding to an advertisement. For example, when a user input is an input for displaying a webpage obtained by replacing an object corresponding to an advertisement with another object, the electronic device may display a webpage obtained by replacing an object corresponding to an advertisement with another object. For example, when a user input is an input for displaying a webpage obtained by replacing an object corresponding to an advertisement with another object designated in advance, the electronic device 101 may display a webpage obtained by replacing an object corresponding to an advertisement with another object designated in advance. For example, when a user input is an input for displaying a webpage obtained by removing an object corresponding to an advertisement, the electronic device 101 may display a webpage obtained by removing an object corresponding to an advertisement.

The term "module" as used herein may, for example, mean a unit including one of hardware, software, and firmware or a combination of two or more of them. The "module" may be interchangeable with a term, such as a unit, a logic, a logical block, a component, or a circuit. The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing operations which has been known or are to be developed hereinafter.

According to various embodiments of the present disclosure, at least some of the devices (for example, modules or functions thereof) or the method (for example, operations) according to the present disclosure may be implemented by a command stored in a computer-readable storage medium in a programming module form. When the command is executed by control circuits, the control circuits may perform a function corresponding to the command. The computer-readable storage medium may, for example, be the memory 360. At least some of the programming modules may be implemented (for example, executed) by, for example, the processor. At least some of the programming modules may include, for example, a module, a program, a routine, a set of instructions or a process for performing one or more functions.

The computer readable recoding medium includes magnetic media such include magnetic media, such as a hard disk, a floppy disk and a magnetic tape, optical media, such as a compact disc-read only memory (CD-ROM) and a DVD, magneto-optical media, such as a floptical disk, and a hardware device specially configured to store and execute a program command, such as a ROM, a random access memory (RAM) and a flash memory. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of controlling displaying in an electronic device, the method comprising:
   receiving at least one keyword for blocking an object included in a webpage;
   determining whether a recognition model corresponding to the at least one keyword is stored in the electronic device in response to receiving the at least one keyword;
   in case of the determining that the recognition model is not stored in the electronic device:
      transmitting information including an identification number of the electronic device and the at least one keyword to a server,
      receiving, from the server, the recognition model corresponding to the at least one keyword, wherein the recognition model is generated by the server based on the transmitted information, wherein the recognition model includes mapping of the at least one keyword according to the identification number and a corresponding object, wherein a plurality of objects corresponding to each keyword are collected in the server, and wherein the recognition model is updated to a learning recognition model in the server based on the corresponding object collected for the at least one keyword, and
      installing the recognition model corresponding to the at least one keyword received from the server in a memory of the electronic device;
   executing the recognition model prior to executing a search for an input in a search field of a web browser;
   receiving a first webpage including at least one object based on a result of the search;
   identifying, by the electronic device, that a first object corresponding to the at least one keyword exists in the first webpage by using the executed recognition model;
   based on the first object existing in the webpage, excluding, by the electronic device, the first object corresponding to the at least one keyword from the first webpage; and
   displaying the first webpage including a second object replacing the first object.

2. The method of claim 1, further comprising:
   receiving a user input for setting a third object corresponding to the at least one keyword to replace the first object; and
   displaying the first webpage including the third object.

3. The method of claim 1, further comprising providing a warning message notifying that the received first webpage includes the first object corresponding to the at least one keyword.

4. The method of claim 1, further comprising:
   generating a pop-up window providing a user interface to block the first object if the first object exists in the received first webpage, and
   displaying the generated pop-up window.

5. The method of claim 1, further comprising:
   identifying that a fourth object corresponding to an advertisement based on the at least one keyword exists in the received first webpage, and
   if the fourth object exists in the received first webpage, replacing the fourth object with a fifth object, or removing the fourth object from the received first webpage.

6. The method of claim 1, wherein the second object comprises preset object based on the at least one keyword.

7. The method of claim 1, further comprising:
   transmitting a new input keyword to the server if the new input keyword is input while operating the recognition model, and
   transmitting information comprising a deleted keyword to the server if a pre-stored keyword is deleted.

8. The method of claim 1, wherein the recognition model is configured to identify whether the first object corresponding to the at least one keyword exists in the received first webpage by using at least one of a pattern recognition, a neural network, or a deep learning.

9. An electronic device for controlling displaying, the electronic device comprising:
   a display;
   a transceiver; and
   at least one processor configured to:
      receive, via the transceiver, at least one keyword for blocking an object included in a webpage,
      determine whether a recognition model corresponding to the at least one keyword is stored in the electronic device in response to receiving the at least one keyword,
      in case it is determined that the recognition model is not stored in the electronic device:
         transmit, via the transceiver, information including an identification number of the electronic device and at least one keyword to a server,
         receive, from the server, the recognition model corresponding to the at least one keyword, wherein the recognition model is generated by the server based on the transmitted information, wherein the recognition model includes mapping of the at least one keyword according to the identification number, and a corresponding object, wherein a plurality of objects corresponding to each keyword are collected in the server, and wherein the recognition model is updated to a learning recognition model in the server based on the corresponding object collected for the at least one keyword, and
         install the recognition model corresponding to the at least one keyword received from the server in a memory of the electronic device,
      execute the recognition model prior to executing a search for an input in a search field of a web browser,
      receive a first webpage including at least one object based on a result of the search, identify that a first object corresponding to the at least one keyword exists in the first webpage by using the executed recognition model, based on the first object existing in the webpage, exclude the first object corresponding to the at least one keyword from the first webpage, and display, on the display, the first webpage including a second object replacing the first object.

10. The electronic device of claim 9, wherein the at least one processor is further configured to:

receive a user input setting a third object corresponding to the at least one keyword to replace the first object; and display the first webpage including the third object.

11. The electronic device of claim 9, wherein the at least one processor is further configured to provide a warning message notifying that the received first webpage includes the first object corresponding to the at least one keyword.

12. The electronic device of claim 9, wherein, if the first object exists in the received first webpage, the at least one processor is further configured to:

generate a pop-up window providing a user interface to block the first object, and control the display to display the generated pop-up window.

13. The electronic device of claim 9, wherein the at least one processor is further configured to:

identify that a fourth object corresponding to an advertisement based on the at least one keyword exists in the received first webpage, and if the fourth object exists in the received first webpage, replace the fourth object with a fifth object, or remove the fourth object from the received first webpage.

14. The electronic device of claim 9, wherein, if an input for viewing the first object is received while displaying the second object, the at least one processor is further configured to replace the second object with the first object and display the first object in the display.

15. The electronic device of claim 9, wherein the at least one processor is further configured to:

transmit a new input keyword to the server if the new input keyword is input while operating the recognition model, and transmit information comprising a deleted keyword to the server if a pre-stored keyword is deleted.

* * * * *